(12) United States Patent
Yagi et al.

(10) Patent No.: US 7,812,893 B2
(45) Date of Patent: Oct. 12, 2010

(54) ACTIVE MATRIX SUBSTRATE WHERE A PORTION OF THE STORAGE CAPACITOR WIRING OR THE SCANNING SIGNAL LINE OVERLAPS WITH THE DRAIN LEAD-OUT WIRING CONNECTED TO THE DRAIN ELECTRODE OF A THIN FILM TRANSISTOR AND DISPLAY DEVICE HAVING SUCH AN ACTIVE MATRIX SUBSTRATE

(75) Inventors: Toshifumi Yagi, Tsu (JP); Toshihide Tsubata, Tsu (JP); Tsuyoshi Tokuda, Tsu (JP); Kenji Enda, Katsuragi (JP); Yoshinori Shimada, Mie (JP); Shinya Maruoka, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 348 days.

(21) Appl. No.: 11/719,028

(22) PCT Filed: Sep. 20, 2005

(86) PCT No.: PCT/JP2005/017304

§ 371 (c)(1),
(2), (4) Date: Jul. 25, 2007

(87) PCT Pub. No.: WO2006/054386

PCT Pub. Date: May 26, 2006

(65) Prior Publication Data

US 2009/0073335 A1    Mar. 19, 2009

(30) Foreign Application Priority Data

Nov. 17, 2004  (JP) .............................. 2004-332889
Jun. 17, 2005  (JP) .............................. 2005-178217

(51) Int. Cl.
*G02F 1/1343* (2006.01)
*G02F 1/1333* (2006.01)
*G02F 1/1337* (2006.01)

(52) U.S. Cl. .......................... 349/39; 349/38; 349/158; 349/129

(58) Field of Classification Search ................... 349/39, 349/38, 158, 129
See application file for complete search history.

(56) References Cited

U.S. PATENT DOCUMENTS 5,953,084 A    9/1999   Shimada et al.

(Continued)

FOREIGN PATENT DOCUMENTS

JP           06-095157 A    4/1994

(Continued)

OTHER PUBLICATIONS

International Search Report for PCT Application No. PCT/JP2005/017304; mailed on Nov. 15, 2005.

*Primary Examiner*—Mike Qi
(74) *Attorney, Agent, or Firm*—Keating & Bennett, LLP

(57) ABSTRACT

An active matrix substrate suppresses reduction in production yield and increase in production steps and simultaneously permits both sufficient securing of a storage capacity and improvement of an aperture ratio of a pixel. The active matrix substrate is an active matrix substrate and includes a thin film transistor disposed at an intersection of a scanning signal line with a data signal line on a substrate, the thin film transistor including a gate electrode connected to the scanning signal line, a source electrode connected to the data signal line, and a drain electrode connected to a drain lead-out wiring; a storage capacitor upper electrode connected to the drain lead-out wiring and a pixel electrode; and a storage capacitor wiring overlapping with the storage capacitor upper electrode through an insulating film, wherein the storage capacitor wiring has an extending portion overlapping with the drain lead-out wiring through the insulating film.

18 Claims, 17 Drawing Sheets

U.S. PATENT DOCUMENTS

| | | | |
|---|---|---|---|
| 6,052,162 A | 4/2000 | Shimada et al. | |
| 6,097,452 A | 8/2000 | Shimada et al. | |
| 6,195,138 B1 | 2/2001 | Shimada et al. | |
| 6,410,358 B1 | 6/2002 | Noritake et al. | |
| 6,411,346 B1 * | 6/2002 | Numano et al. | 349/39 |
| 6,433,851 B2 | 8/2002 | Shimada et al. | |
| 6,573,964 B1 * | 6/2003 | Takizawa et al. | 349/129 |
| 6,654,073 B1 * | 11/2003 | Maruyama et al. | 349/38 |
| 6,724,443 B1 | 4/2004 | Sano et al. | |
| 6,839,099 B2 * | 1/2005 | Fukunishi | 349/54 |
| 7,034,789 B2 | 4/2006 | Takeuchi et al. | |
| 7,119,870 B1 | 10/2006 | Nishikawa et al. | |
| 2001/0002857 A1 | 6/2001 | Shimada et al. | |
| 2001/0052889 A1 | 12/2001 | Fukunishi | |
| 2002/0076845 A1 | 6/2002 | Noritake et al. | |
| 2004/0001167 A1 | 1/2004 | Takeuchi et al. | |
| 2006/0038948 A1 | 2/2006 | Nishikawa et al. | |
| 2006/0097972 A1 | 5/2006 | Takeuchi et al. | |
| 2006/0285045 A1 | 12/2006 | Nishikawa et al. | |
| 2007/0046875 A1 | 3/2007 | Nishikawa et al. | |
| 2007/0046876 A1 | 3/2007 | Nishikawa et al. | |

FOREIGN PATENT DOCUMENTS

| | | |
|---|---|---|
| JP | 09-120082 A | 5/1997 |
| JP | 09-152625 A | 6/1997 |
| JP | 09-222615 A | 8/1997 |
| JP | 11-052418 A | 2/1999 |
| JP | 2000-002889 A | 1/2000 |
| JP | 2001-125139 A | 5/2001 |
| JP | 2001-194671 A | 7/2001 |
| JP | 2002-055361 A | 2/2002 |
| JP | 2004-078157 A | 3/2004 |

* cited by examiner

ACTIVE MATRIX SUBSTRATE WHERE A PORTION OF THE STORAGE CAPACITOR WIRING OR THE SCANNING SIGNAL LINE OVERLAPS WITH THE DRAIN LEAD-OUT WIRING CONNECTED TO THE DRAIN ELECTRODE OF A THIN FILM TRANSISTOR AND DISPLAY DEVICE HAVING SUCH AN ACTIVE MATRIX SUBSTRATE

BACKGROUND OF THE INVENTION

1. Field of the Invention

The present invention relates to an active matrix substrate and a display device. More specifically, the present invention relates to an active matrix substrate in which a thin film transistor for drive control of a liquid crystal layer and a storage capacitor element are disposed in every pixel, and also relates to an active matrix liquid crystal display device.

2. Description of the Related Art

Active matrix substrates have been widely used in active matrix display devices such as a liquid crystal display device and an EL (Electro luminescence) display device. In conventional active matrix liquid crystal display devices, a switching element such as a TFT (Thin Film Transistor) is disposed at every intersection of a plurality of scanning signal lines with a plurality of data signal lines disposed to intersect with each other on a substrate, and an image signal is transmitted to every pixel by a switching function of the switching element. Further, a storage capacitor element disposed at every pixel is disclosed (for example, refer to, Japanese Kokai Publication No. Hei-06-95157, hereinafter referred to as Patent Document 1). Such a storage capacitor element prevents deterioration of the image signal due to self-discharge of a liquid crystal layer when the TFT and the like is in OFF-state or an OFF-state current of the TFT and the like. The storage capacitor element is used for not only maintaining the image signal when the TFT and the like is in OFF-state, but also as a pathway for application of various modulation signals in liquid crystal driving. Liquid crystal display devices including such a storage capacitor element can permit both low power consumption and high image quality.

One example of a structure of a conventional active matrix substrate is mentioned with reference to drawings.

FIG. 16 is a planar view schematically showing a configuration of one pixel of a conventional active matrix substrate including a storage capacitor element.

In FIG. 16, a plurality of pixel electrodes 51 are formed on an active matrix substrate in a matrix pattern. Around these pixel electrodes 51, a scanning signal line 52 for supplying a scanning signal and a data signal line 53 for supplying a data signal are formed to intersect with each other. At the intersection of the scanning signal line 52 with the data signal line 53, a TFT 54 is disposed as a switching element connected to the pixel electrode 51. The scanning signal line 52 is connected to a gate electrode of this TFT 54, and a scanning signal input into the gate electrode drives and controls the TFT 54. The data signal line 53 is connected to a source electrode of this TFT 54, and a data signal is input into the source electrode of the TFT 54. To a drain electrode of the TFT 54, a drain lead-out wiring 55 is connected. Through the drain lead-out wiring 55, one electrode (storage capacitor upper electrode) 55a constituting a storage capacitor element is, and through the storage capacitor upper electrode 55a and a contact hole 56, the pixel electrode 51 is connected to the drain electrode. A storage capacitor wiring 57 serves as the other electrode (storage capacitor lower electrode) constituting the storage capacitor element.

FIG. 17 is a cross-sectional view schematically showing a cross-section of the active matrix substrate taken along line X-X' in FIG. 16.

In FIG. 17, a gate electrode 62 connected to the scanning signal line 52 is formed on a transparent insulating substrate (insulating substrate) 61 such as a glass substrate and a plastic substrate. The scanning signal line 52 and the gate electrode 62 are formed of a film of a metal such as titanium, chromium, aluminum, and molybdenum, a film of an alloy of such metals, or a stacked film of such films. The storage capacitor wiring 57 constituting the other electrode (storage capacitor lower electrode) constituting the storage capacitor element is made of the same material as that of the scanning signal line 52 and the gate electrode 62. Thereover, a gate insulating film 63 is formed. The gate insulating film 63 is formed of an insulating film such as a silicon nitride film and a silicon oxide film. Thereon, a high resistance semiconductor layer 64 made of amorphous silicon, polysilicon, and the like, and a low resistance semiconductor layer which is made of $n^+$ amorphous silicon into which impurities such as phosphorus are doped and constitutes a source electrode 66a and a drain electrode 66b, are formed to overlap with the gate electrode 62. The data signal line 53 is formed to be connected to the source electrode 66a. The drain lead-out wiring 55 is formed to be connected to the drain electrode 66b. The drain lead-out wiring 55 is extended to be connected to the storage capacitor upper electrode 55a. The pixel electrode 51 is connected to the storage capacitor upper electrode 55a through the contact hole 56, and further connected to the drain electrode 66b through the drain lead-out wiring 55. The data signal line 53, the drain lead-out wiring 55, and the storage capacitor upper electrode 55a are made of the same material. A film of a metal such as titanium, chromium, aluminum, and molybdenum, a film of an alloy of such metals, or a stacked film of such films may be used. The pixel electrode 51 is formed of a conductive film with transparency such as an ITO (indium tin oxide) film, IZO (indium zinc oxide) film, a zinc oxide film, and a tin oxide film. The contact hole 56 is formed to penetrate an interlayer insulating film 68 formed to cover the upper surface of the data signal line 53, the TFT 54, and the drain lead-out wiring 55. Examples of materials for the interlayer insulating film 68 include acrylic resin, silicon nitride, and silicon oxide. Japanese Kokai Publication No. Hei-09-152625, hereinafter referred to as Patent Document 2, discloses an active matrix substrate having the structure shown in FIGS. 16 and 17, for example.

In the active matrix substrate having such a structure, the storage capacitor wiring (storage capacitor lower electrode) 57 is formed in the same step as a step of forming the scanning signal line 52, and the storage capacitor upper electrode 55a is formed in the same step as a step of forming the data signal line 53 and/or the drain lead-out wiring 55, in order to simplify the production processes and reduce production costs. If the pixel electrode 51 is formed on the interlayer insulating film 68 as shown in FIG. 17, the pixel electrode 51 can overlap with each of the signal lines 52 and 53. Therefore, the aperture ratio can be increased and an effect of shielding an electrical field from each of the signal lines 52 and 53 to the pixel electrode 51 can be obtained. As for connection between the pixel electrode 51 and the drain electrode 66b, the contact hole 56 is formed in the interlayer insulating film 68 above the storage capacitor wiring 57 pattern or the scanning signal line 52 pattern, and thereby the pixel electrode 51 is connected to the storage capacitor upper electrode 55a. As a result, the pixel electrode 51 is electrically connected to the drain electrode 66b through the drain lead-out wiring 55. The contact hole 56 may not be necessarily positioned above the storage capacitor upper electrode 55a, and may be positioned above the drain lead-out wiring 55. However, if the contact hole 56 is formed on the storage capacitor upper electrode 55a above the storage capacitor wiring 57 pattern as shown in FIG. 16, further reduction in the aperture ratio can be prevented.

The storage capacitor wiring of the active matrix substrate as shown in FIGS. 16 and 17 needs to be configured to have a specific value or more of Ccs/Clc that is a ratio of a liquid crystal capacity Clc to a capacity of the storage capacity element Ccs in order to secure the functions of the storage capacity element. Therefore, if the insulating film between the storage capacitor upper electrode and the storage capacitor wiring is made of one material and have an uniform thickness, the region where the storage capacitor upper electrode overlaps with the storage capacitor wiring needs to secure an area above a certain level, and thereby the storage capacity is secured to some extent. However, if a method of increasing the line width of a part of the storage capacitor wiring is used for securing the storage capacity for increase in the area of the region where the storage capacitor upper electrode overlaps with the storage capacitor wiring, the aperture ratio is reduced. In the active matrix substrate used in the liquid crystal display device, the area of the transmissive region through which an electromagnetic wave in the optical region passes, and the aperture ratio that is a proportion of the area of the transmissive region relative to the pixel are extremely important for securing display brightness.

For this problem, a method of decreasing a distance (SD gap) Lsd between the data signal line and the storage capacitor upper electrode may be mentioned as a method of increasing the area of the storage capacitor element without reduction in aperture ratio. In such a case, a short circuit attributed to a film remainder of a resist used for data signal line and storage capacitor upper electrode patterning is easily caused between the data signal line and the storage capacitor upper electrode, which reduces the production yield. Therefore, the SD gap can not be easily decreased to below a specific distance.

Therefore, a structure in which the storage capacitor wiring has a large line width is conventionally used for securing the capacity of the storage capacitor element and the aperture ratio is sacrificed. In such a structure, the line width is larger than needed in terms of a wiring resistance. Therefore, the wiring width needs to be reduced. For example, the storage capacitor wiring (auxiliary capacitor wiring) described in FIGS. 11, 13, and 14 of Japanese Kokai Publication No. 2004-78157, hereinafter referred to as Patent Document 3 partly has a line width larger than a line width needed in terms of the wiring resistance because the storage capacity between the storage capacitor wiring and the storage capacitor upper electrode (auxiliary capacitor electrode) needs to be secured to some extent.

Therefore, the aperture ratio needs to be improved by decreasing the wiring widths of the storage capacitor upper electrode and the storage capacitor wiring, the wiring widths being increased for securing the storage capacity, thereby reducing a light-shielding region. In such a respect, there was room for improvement.

Japanese Kokai Publication No. Hei-11-52418, hereinafter referred to as Patent Document 4, discloses a technology in which an extending portion of a storage capacitor wiring (auxiliary capacitor wiring) is formed along the outer periphery of a pixel electrode in a configuration in which the pixel electrode is directly connected to a drain electrode. However, in a configuration in which the pixel electrode is formed on an interlayer insulating film, the aperture ratio is improved by disposing a data signal line and the like along the outer periphery of the pixel electrode. Therefore, in such a configuration, the technology can not realize further improvement in aperture ratio.

SUMMARY OF THE INVENTION

In order to overcome the problems described above, preferred embodiments of provide an active matrix substrate which suppresses reduction in production yield and increase in production steps and simultaneously permits both securing of a sufficient storage capacity and improvement of an aperture ratio of a pixel; and a display device using such an active matrix substrate.

The present inventors made various investigations about active matrix substrate configurations which can sufficiently secure a storage capacity and suppress reduction in aperture ratio. The inventors noted a drain lead-out wiring which is connected to a storage capacitor upper electrode constituting a storage capacitor element and formed in the same step as a step of forming the storage capacitor upper electrode. The inventors found that if a portion extended from a storage capacitor lower electrode (extending portion) is additionally formed and thereby a region overlapping with the drain lead-out wiring is formed, the storage capacitor element can additionally generate a capacity between the drain extending wiring and the extending portion of the storage capacitor lower electrode, and the drain lead-out wiring can be used as a part of the storage capacitor element. The inventors also found that as a result, a part of the storage capacitor lower electrode and a part of the storage capacitor upper electrode, which correspond to the additionally generated capacity, are made redundant, and the wiring resistance of the storage capacitor lower electrode is suppressed to below an acceptable value and the aperture ratio can be improved, and therefore, both sufficient securing of the storage capacity and improvement in aperture ratio of a pixel can be permitted. Further, such functional effects can be exhibited in both a Cs-on-Common system in which a storage capacitor wiring is used as the storage capacitor lower electrode and a Cs-on-Gate system in which a scanning signal line is used as the storage capacitor lower electrode. The above-mentioned problems can be admirably solved, leading to completion of the present invention.

According to a preferred embodiment of the present invention, an active matrix substrate includes a thin film transistor disposed at an intersection of a scanning signal line with a data signal line on a substrate, the thin film transistor including a gate electrode connected to the scanning signal line, a source electrode connected to the data signal line, and a drain electrode connected to a drain lead-out wiring; a storage capacitor upper electrode connected to the drain lead-out wiring and a pixel electrode; and a storage capacitor wiring overlapping with the storage capacitor upper electrode through an insulating film, wherein the storage capacitor wiring has an extending portion overlapping with the drain lead-out wiring through the insulating film.

According to another preferred embodiment of the present invention, an active matrix substrate includes a thin film transistor disposed at an intersection of a scanning signal line with a data signal line on a substrate, the thin film transistor including a gate electrode connected to the scanning signal line, a source electrode connected to the data signal line, and a drain electrode connected to a drain lead-out wiring; and a storage capacitor upper electrode connected to the drain lead-out wiring and a pixel electrode, wherein the scanning signal line has a portion overlapping with the storage capacitor upper electrode through an insulating film and has an extending portion overlapping, through the insulating film, with the drain lead-out wiring connected to the storage capacitor upper electrode.

Preferred embodiments of the present invention are described in more detail below.

The active matrix substrate according to various preferred embodiments of the present invention includes a thin film transistor, a storage capacitor upper electrode, and a storage capacitor wiring. The thin film transistor is preferably disposed at an intersection of a scanning signal line with a data signal line on a substrate, and includes a gate electrode connected to the scanning signal line, a source electrode connected to the data signal line and a drain electrode connected to a drain lead-out wiring. Such a thin film transistor can be used as a switch for sampling a data signal simultaneously supplied for plural data signal lines by a scanning signal successively supplied for plural scanning signal lines intercrossing with the data signal lines. In the present description, the above-mentioned drain lead-out wiring means a wiring for connecting the drain electrode of the thin film transistor to the storage capacitor upper electrode.

The above-mentioned storage capacitor upper electrode is connected to the drain lead-out wiring and a pixel electrode, and is formed to overlap with the storage capacitor wiring through at least an insulating film, and together with them, constitutes a storage capacitor element. Examples of preferred embodiments of such a storage capacitor wiring in Cs-on-Common system include an embodiment in which the storage capacitor wiring is formed in the same step as a step of forming the scanning signal lines and a plurality of the storage capacitor wirings is disposed parallel to the scanning signal lines.

In various preferred embodiments of the present invention, the above-mentioned storage capacitor wiring has a portion overlapping with the storage capacitor upper electrode through an insulating film, and has an extending portion overlapping with the drain lead-out wiring through the insulating film. That is, in the active matrix substrate of preferred embodiments of the present invention, the wiring extended from the storage capacitor wiring (extending portion) is formed and the extending portion of the storage capacitor wiring overlaps with the drain lead-out wiring through an insulating film, and thereby a capacity of the storage capacity element is increased. Such a storage capacitor element can show a function of maintaining the data signal supplied for the data signal line because the storage capacitor upper electrode is connected to the thin film transistor through the drain lead-out wiring. The extending portion of the storage capacitor wiring is not especially limited as long as it has a portion overlapping with at least a part of the drain lead-out wiring through the insulating film. The extending portion of the storage capacitor wiring may not overlap with the entire drain lead-out wiring through the insulating film and the entire extending portion of the storage capacitor wiring may not overlap with the drain lead-out wiring through the insulating film.

As long as the active matrix substrate of preferred embodiments of the present invention essentially includes such components, the configuration of other components is not especially limited, and the substrate may or not may include other components. For example, the pixel electrode may be directly connected to the drain lead-out wiring or may be directly connected to the storage capacitor upper electrode as long as the pixel electrode is electrically connected to the thin film transistor.

In the active matrix substrate of preferred embodiments of the present invention, the extending portion of the storage capacitor wiring overlaps with the drain lead-out wiring through the insulating film and forms the storage capacitor element. Therefore, a part of the storage capacitor wiring and a part of the storage capacitor upper electrode, which corresponds to the additionally formed capacity, can be eliminated. As a result, the pattern of the storage capacitor wiring and/or the storage capacitor upper electrode additionally formed for capacity formation can be shortened within the range where the wiring resistance of the storage capacitor wiring can be suppressed to below an acceptable value. Therefore, degree of design freedom of the substrate (circuit configuration) is improved. Therefore, a sufficient capacity is secured and simultaneously the aperture ratio can be improved by thinning the storage capacitor wiring, for example. In the present invention, the drain lead-out wiring is generally formed in the same step as a step of forming the data signal line, and the extending portion of the storage capacitor wiring can be formed in the same step as a step of forming the scanning signal line and/or the storage capacitor wiring. Therefore, the structure of preferred embodiments of the present invention can be formed without performing additional steps.

Thus, the active matrix substrate according to preferred embodiments of the present invention can sufficiently secure the storage capacity and simultaneously improve the aperture ratio of the pixel. Therefore, if such a substrate is used as a substrate of a display device such as a liquid crystal display device, improvement in display quality and brightness, and reduction in electric power consumption can be permitted in the display device. Therefore, such a substrate can be preferably used in a liquid crystal display panel, a liquid crystal display device, and the like used in a large-size liquid crystal TV for which high display qualities and performances are needed.

In preferred embodiments of the present invention, the storage capacitor element may have a portion where the scanning signal line overlaps with the storage capacitor upper electrode through at least insulating film. If preferred embodiments of the present invention are applied to such a system where the scanning signal line is used as the storage capacitor lower electrode constituting the storage capacitor element (Cs-on-Gate system), the above-mentioned scanning signal line has a portion overlapping with the storage capacitor upper electrode through the insulating film and has an extending portion overlapping, through the insulating film, with the drain lead-out wiring connected to the storage capacitor upper electrode. Thus, the drain lead-out wiring connected to a (specific) storage capacitor upper electrode overlapping with a (specific) scanning signal line overlaps with an extending portion of the (specific) scanning signal line, thereby increasing the capacity of the storage capacitor element. In addition to the Cs-on-Common system where the storage capacitor wiring is formed as the storage capacitor lower electrode, the functional effects of the present invention can be obtained also in the Cs-on-Gate system.

Preferred embodiments of the active matrix substrate of the present invention are mentioned below.

In preferred embodiments of the present invention, it is preferable that the extending portion of the storage capacitor wiring or the scanning signal line has a substantially linear shape, and the drain lead-out wiring has a line width smaller than a line width of the extending portion of the storage capacitor wiring or the scanning signal line. The pattern end of the extending portion of the storage capacitor wiring or the scanning signal line is a portion where a short circuit between the extending portion and the drain lead-out wiring formed after the storage capacitor wiring or the scanning signal line is easily generated because the pattern end has a low insulating film-coverage due to the presence of the step (taper). Therefore, if the drain lead-out wiring and the extending portion of the storage capacitor wiring or the scanning signal line are pattern-formed by a photolithography method, the drain lead-out wiring is formed to have a line width smaller than a line width of the extending portion of the storage capacitor wiring or the scanning signal line. As a result, the drain lead-out wiring pattern is prevented from overlapping with the pattern end of the extending portion, which can effectively prevent the short circuit.

In addition, a probability that due to misalignment in an exposure step or scanning misalignment in a photolithography method, the drain lead-out wiring pattern is formed off the pattern of the extending portion of the storage capacitor wiring can be reduced. As a result, capacitance change caused by changing in the area of the region where the drain lead-out wiring overlaps with the extending portion of the storage capacitor wiring can be effectively prevented.

In preferred embodiments of the present invention, it is preferable that the drain lead-out wiring has two or more pathways (is branched into plural lines). The term "or more" in the present description includes the value described. Preferred embodiments of such a drain lead-out wiring include (1) a preferred embodiment in which one drain lead-out wiring connected to the thin film transistor is branched into two or more portions and each portion is connected to the storage capacitor upper electrode; (2) a preferred embodiment in which two or more drain lead-out wirings connected to the thin film transistor are joined and connected to the storage capacitor upper electrode; and (3) an embodiment in which two or more drain lead-out wirings connected to the thin film transistor are cross-linked or not cross-linked to be connected to the storage capacitor upper electrode. Among them, the preferred embodiment (3) is preferable. If the drain lead-out wiring is in the above-mentioned preferred embodiments (1) to (3), the data signal from the thin film transistor is transmitted to the storage capacitor upper electrode through two or more conductive pathways. Therefore, a probability that a disconnection at a part of the drain lead-out wiring causes insulation between the thin film transistor and the storage capacitor upper electrode, can be reduced. Further, the storage capacity formed between the drain lead-out wiring and the extending portion of the storage capacitor wiring or the scanning signal line can be easily increased, in comparison to the case where the drain lead-out wiring is not branched into plural lines.

That is, if the active matrix substrate in the above-mentioned configurations is used as a substrate for display devices such as a liquid crystal display device, a point defect (pixel defect) in display images caused by disconnection of the drain lead-out wiring can be effectively suppressed and yield can be improved, and further the storage capacity is sufficiently secured and simultaneously the aperture ratio in the pixel can be improved.

In preferred embodiments of the present invention, it is preferable that the extending portion of the storage capacitor wiring or the scanning signal line has a separation region not overlapping with the drain lead-out wiring. The separation region not overlapping with the drain lead-out wiring is a region where the extending portion of the storage capacitor wiring or the scanning signal line can be electrically divided by laser irradiation and the like without causing disconnection of the drain lead-out wiring. Due to formation of such a separation region, even if a conductive foreign substance or a pin hole exists in the insulating film between the extending portion of the storage capacitor wiring or the scanning signal line and the drain lead-out wiring and thereby a short circuit between the extending portion of the storage capacitor wiring or the scanning signal line and the drain lead-out wiring is generated, or even if a film remainder and the like generated between the extending portion of the storage capacitor wiring and the scanning signal line formed in the same step as a step of forming the storage capacitor wiring (and the extending thereof) causes a short circuit between the extending portion of the storage capacitor wiring and the scanning signal line, a part of the extending portion including the short-circuit portion is electrically separated at the separation region of the extending portion not overlapping with the drain lead-out wiring. As a result, the rest of the extending portion can effectively function as a part of the storage capacitor element, and the functions of the storage capacitor element can be maintained.

In preferred embodiments of the present invention, it is preferable that the extending portion of the storage capacitor wiring or the scanning signal line has a portion overlapping with at least one of a projection for liquid crystal alignment control and an electrode non-formation portion in a liquid crystal display device. That is, it is preferable in preferred embodiments of the present invention that at least a part of the pattern of the extending portion of the storage capacitor wiring overlaps with at least a part of the pattern of the projection for liquid crystal alignment control pattern and/or the electrode non-formation portion in the liquid crystal display device. The projection for liquid crystal alignment control and the electrode non-formation portion may be formed in the active matrix substrate of the present invention constituting the liquid crystal display device, or may be formed in a substrate opposite to the active matrix substrate (hereinafter, also referred to as counter substrate). "The extending portion of the storage capacitor wiring or the scanning signal line overlaps with the projection for liquid crystal alignment control and the electrode non-formation portion" means a state where the pattern of the extending portion of the storage capacitor wiring or the scanning signal line and the pattern of the projection for liquid crystal alignment control and the electrode non-formation portion are superposed with each other when a liquid crystal panel prepared by attaching the active matrix substrate to the counter substrate is viewed from the normal direction of the panel surface.

Examples of the projection for liquid crystal alignment control include a projection structure having a rib shape and the like, formed on the pixel electrode of the active matrix substrate or formed on a common electrode of the counter substrate. Examples of the electrode non-formation portion include an electrode opening having a slit shape and the like, formed on the pixel electrode of the active matrix substrate or formed on the common electrode of the counter substrate. These structures are preferably used if the active matrix substrate of the present invention is applied to a liquid crystal display device in MVA (Multi-domain Vertical Alignment) system in which liquid crystal molecules vertically align between a pair of substrates under no voltage application and one pixel is divided into plural domains. In this case, it is preferable that the projection for liquid crystal alignment control and the electrode non-formation portion are used for controlling alignment of the liquid molecules.

According to preferred embodiments of the present invention, in these liquid crystal display devices, the extending portion of the storage capacitor wiring or the scanning signal line, which generally forms a light-shielding region, is disposed at a position corresponding to the projection for liquid crystal alignment control and/or the electrode non-formation portion, which have/has a small contribution (are/is effectively used) as an opening (light transmissive region). As a result, reduction in aperture ratio, due to the extending portion, can be prevented.

The MVA system is a system in which one pixel is divided into plural domains for improving viewing angle characteristics of a vertical alignment liquid crystal display device. Examples of the method of forming the domains by division include a method of providing the pixel electrode in the active matrix substrate and/or the counter electrode in the color filter substrate with an electrode-removed pattern (electrode opening) and a method of providing the substrate(s) with the projection for liquid crystal alignment control. In this MVA system, using fringe field effect attributed to the electrode opening and/or the projection for liquid crystal alignment control, and/or inclination alignment of liquid crystal molecules near the inclining projection, the liquid crystal molecules in one pixel are aligned in a plurality of directions. As a result, a wide viewing angle can be permitted.

In preferred embodiments of the present invention, it is preferable that the storage capacitor upper electrode is divided into two or more portions in one pixel, and each portion is connected to the drain lead-out wiring, and the drain lead-out wiring has a separation region not overlapping with the extending portion of the storage capacitor wiring at least one connecting portion with the storage capacitor upper electrode. As a result, even if a short circuit is generated between a part of the storage capacitor upper electrode and the storage capacitor wiring and thereby a pixel defect is generated, the short-circuited storage capacitor upper electrode is electrically insulated and separated from the thin film transistor, thereby repairing the pixel defect.

In preferred embodiments of the present invention, it is preferable that the storage capacitor upper electrode is divided into two or more portions in one pixel, and each portion is connected to the drain lead-out wiring, and the extending portion of the storage capacitor wiring has a separation region not overlapping with the drain lead-out wiring at a boundary with the storage capacitor wiring. As a result, if a short circuit is generated between the extending portion of the storage capacitor wiring and the scanning signal line or if a short circuit is generated between the drain lead-out wiring and the extending portion of the storage capacitor wiring, a part of the short-circuited extending portion of the storage capacitor wiring is melted and separated from the storage capacitor wiring, and thereby the short-circuited pixel can be repaired to serve as a normal pixel without remaining as a defective pixel. If the extending portion of the storage capacitor wiring has a region not overlapping with the drain lead-out wiring at a boundary with the storage capacitor wiring, the extending portion of the storage capacitor wiring can be electrically insulated and separated form the drain leading wiring wherever the short circuit between the drain lead-out wiring and the extending portion of the storage capacitor wiring is generated. Therefore, the short-circuited pixel can be repaired to serve as a normal pixel without remaining as a defective pixel.

Other preferred embodiments of the present invention provide a display device and a liquid crystal display device each including the active matrix substrate. In the display device and the liquid crystal display device of these preferred embodiments of the present invention, the active matrix substrate according to other preferred embodiments of the present invention is used as a component. Therefore, reduction in production yield and increase in production steps are suppressed and simultaneously both sufficient securing of a storage capacity and improvement in aperture ratio of a pixel can be permitted, and therefore a display device excellent in display qualities can be provided.

The liquid crystal display device according to a preferred embodiment of the present invention has a structure in which liquid crystal substances are interposed between the active matrix substrate including the pixel electrode and a counter substrate including a counter electrode and a color filter. The device displays images by controlling alignment of liquid crystal molecules in the liquid crystal substances by an electrical field formed by a voltage applied between the pixel electrode and the counter electrode, and by this alignment control, adjusting a transmission amount of light from a backlight and the like.

In the present invention, it is preferable that the liquid crystal display device includes a counter electrode-formed counter substrate at a position opposite to the active matrix substrate, wherein the extending portion of the storage capacitor wiring or the scanning signal line formed in the active matrix substrate has a portion overlapping with at least one of a projection for liquid crystal alignment control, a pixel electrode non-formation portion, and a counter electrode non-formation portion, disposed in at least one of the active matrix substrate and the counter substrate. As a result, reduction in aperture ratio, due to the extending portion of the storage capacitor wiring or the scanning signal line, can be prevented.

As long as each of the display device and the liquid crystal display device of the present invention has the above-mentioned characteristics and further includes components which a display device generally includes, a configuration of other components is not especially limited. In the present invention, it is preferable that a pixel including the extending portion of the storage capacitor wiring or the scanning signal line constitutes every pixel. However, such a pixel needs not constitute every pixel, as long as it constitutes most of the pixels.

The active matrix substrate according to preferred embodiments of the present invention has the above-mentioned configuration, and reduction in production yield and increase in production steps are suppressed and simultaneously the storage capacity can be sufficiently secured. Further, the opening ratio can be improved by reducing the area of the storage capacitor wiring and/or the storage capacitor upper electrode additionally formed for securing a capacity, within the range where the wiring resistance of the storage capacitor wiring can be suppressed to below an acceptable value. In a preferred embodiment of the present invention, instead of the storage capacitor wiring, the scanning signal line is used as the storage capacitor electrode, like the Cs-on-Gate system, the same functional effects can be obtained by providing the scanning signal line with the extending portion.

If the active matrix substrate of various preferred embodiments of the present invention is preferably used as a substrate for display devices such as a liquid crystal display device, excellent display quality is secured and improvement in brightness or reduction in power consumption can be permitted. Therefore, the active matrix substrate according to preferred embodiments of the present invention can be preferably used in a liquid crystal display panel, a liquid crystal display device, and the like used in a large-size liquid crystal TV for which high display qualities and performances are needed.

Other features, elements, advantages and characteristics of the present invention will become more apparent from the following detailed description of preferred embodiments thereof with reference to the attached drawings.

DETAILED DESCRIPTION OF PREFERRED EMBODIMENTS

With reference to the following preferred embodiments, the present invention is mentioned below in more detail using the drawings, but the present invention is not limited to only these preferred embodiments.

Preferred Embodiment 1

Figure 1:
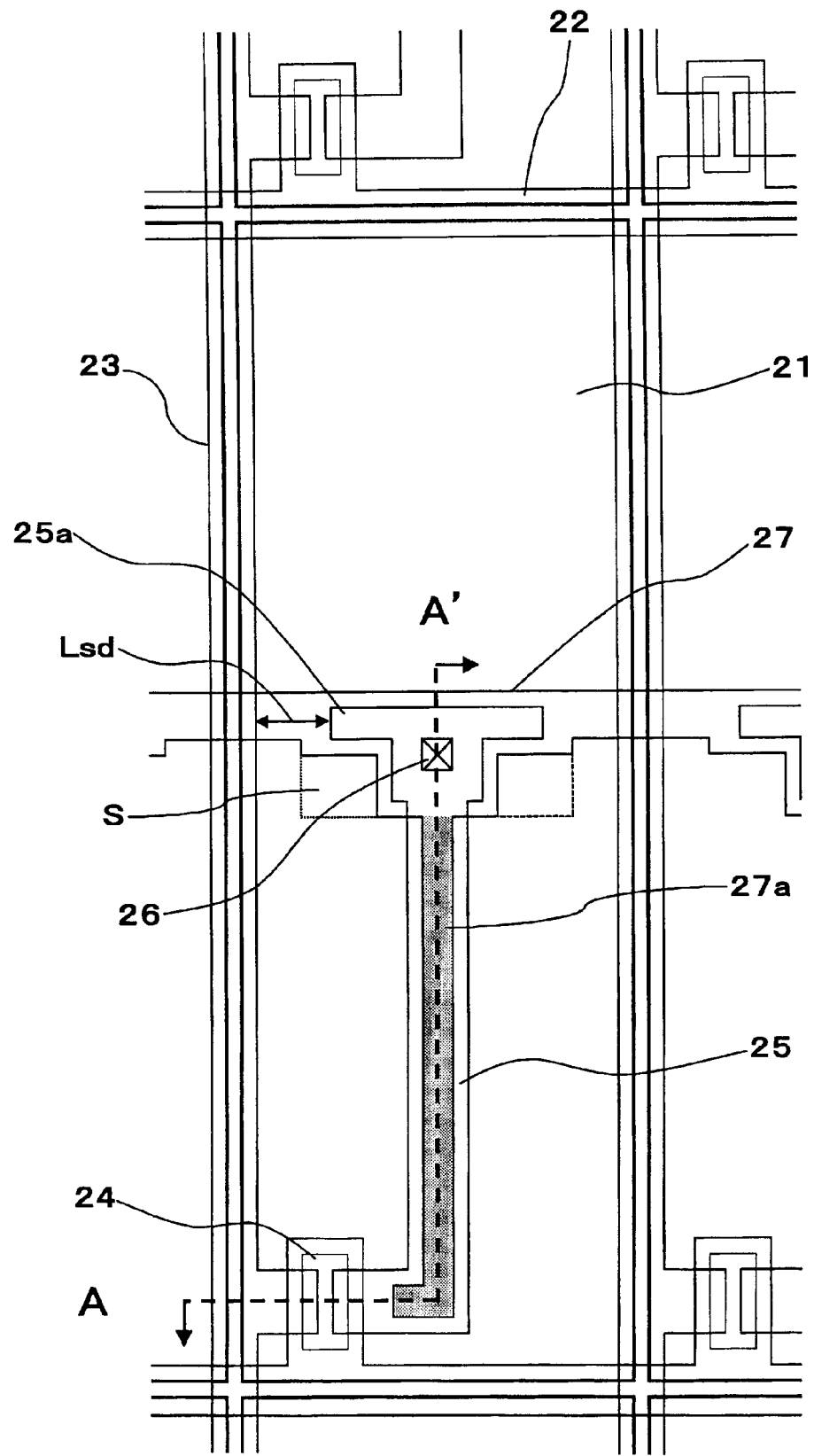
FIG. 1 is a planar view schematically showing a configuration of one pixel of an active matrix substrate according to Preferred Embodiment 1 (Cs-on-Common system).
Figure 2:
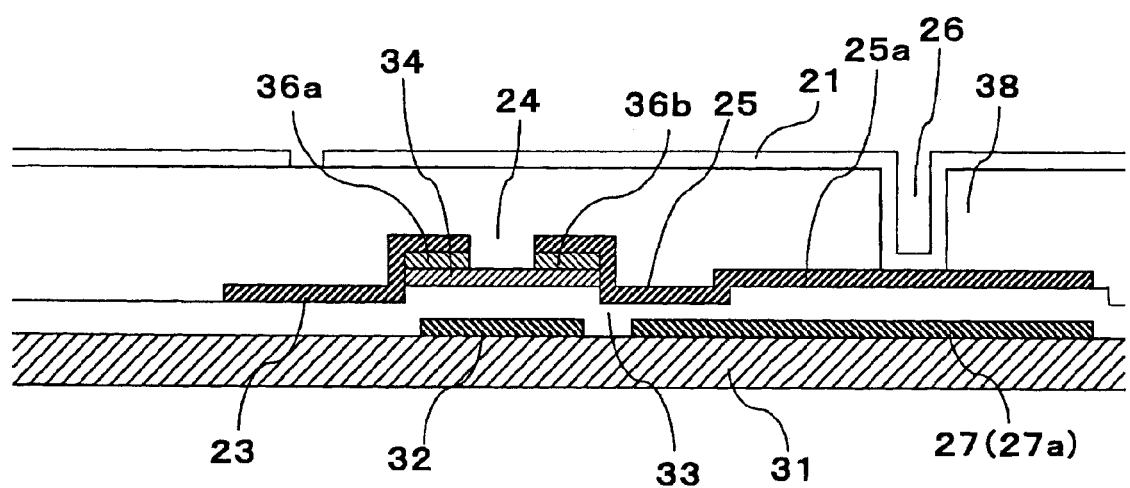
FIG. 2 is a cross-sectional view schematically showing a cross-section of the active matrix substrate taken along line A-A' in FIG. 1.

FIG. 1 is a planar view schematically showing a configuration of one pixel of an active matrix substrate according to Preferred Embodiment 1. FIG. 2 is a cross-sectional view schematically showing a cross-section of the active matrix substrate taken along line A-A' in FIG. 1.

In FIG. 1, the active matrix substrate includes a plurality of pixel electrodes 21 arrayed in a matrix pattern. A scanning signal line 22 for supplying a scanning signal and a data signal line 23 for supplying a data signal are disposed to surround these pixel electrodes 22 and intersect with each other. At the intersection of the scanning signal line 22 and the data signal line 23, a TFT 24 as a switching element connected to the pixel electrode 21 is disposed. To a gate electrode 32 of this TFT 24, the scanning signal line 22 is connected, and the TFT 24 is driven and controlled by a scanning signal input into the gate electrode 32. The data signal line 23 is connected to a source electrode 36a of the TFT 24, and a data signal is input into the source electrode 36a of the TFT 24. To the drain electrode 36b, a drain lead-out wiring 25 is connected, and through the drain lead-out wiring 25, one electrode (storage capacitor upper electrode) 25a constituting a storage capacitor element is connected, and through the wiring 25, the electrode 25a, and a contact hole 26, the pixel electrode 21 is connected. A storage capacitor wiring 27 functions as the other electrode (storage capacitor lower electrode) constituting the storage capacitor element (Cs-on-Common system).

From the storage capacitor wiring 27, an extending portion of the storage capacitor wiring 27a is extended to partly overlap with the drain leading wiring 25. A storage capacity is formed between the drain lead-out wiring 25 and the extending portion of the storage capacitor wiring 27a. In drawings, the region where the extending portion of the storage capacitor wiring 27a overlaps with the drain lead-out wiring 25 is colored.

In FIG. 2, the gate electrode 32 connected to the scanning signal line 22 is disposed on a transparent insulating substrate 31 such as a glass substrate and aplastic substrate. The scanning signal line 22 and the gate electrode 32 are formed by forming a film of a metal such as titanium, chromium, aluminum, and molybdenum, a film of an alloy of such metals, a stacked film of such films by a publicly known sputtering method and the like in such a way that the film has a thickness of 1000 to 3000 Å, and patterning the film by a method such as photoetching method. The storage capacitor wiring 27 constituting the other electrode (storage capacitor lower electrode) constituting the storage capacitor element and the extending portion of the storage capacitor wiring 27a are formed of the same material and in the same step as those in the scanning signal line 22 and/or the gate electrode 32.

A gate insulating film 33 is formed over the entire substrate to cover the upper surface of the gate electrode 32, the scanning signal line 22, the storage capacitor wiring 27 and the extending portion of the storage capacitor wiring 27a. The gate insulating film 33 is formed of an insulating film of silicon nitride film, silicon oxide film, metal oxide film, and the like. On the gate insulating film 33, a high resistance semiconductor layer 34 made of amorphous silicon, polysilicon, and the like is disposed to overlap with the gate electrode 32. Thereon, a low resistance semiconductor layer which constitutes the source electrode 36a and the drain electrode 36b and is made of n$^+$ amorphous silicon prepared by doping impurities such as phosphorus into amorphous silicon is disposed as an ohmic contact layer. The gate insulating film 33, the high resistance semiconductor layer 34, and the low resistance semiconductor layer are formed by forming a film by a plasma CVD (Chemical Vapor Deposition) method and the like, and patterning the film by a photoetching method and the like. The gate insulating film 33 is preferably formed to have a thickness of 3000 to 4000 Å if made of silicon nitride, for example. The high resistance semiconductor layer 34 is preferably formed to have a thickness of 1500 to 2500 Å if made of amorphous silicon, for example. The low resistance semiconductor layer is preferably formed to have a thickness of about 300 to 500 Å if made of $n^+$ amorphous silicon, for example.

Further, the data signal line 23 is formed to be connected to the source electrode 36*a*. The drain lead-out wiring 25 and the storage capacitor upper electrode 25*a* are formed to be connected to the drain electrode 36*b*. The storage capacitor upper electrode 25*a* is connected to the pixel electrode 21 through the contact hole 26 penetrating an interlayer insulating film 38. The data signal line 23, the drain lead-out wiring 25, and the storage capacitor upper electrode 25*a* are simultaneously formed in one step. The data signal line 23, the drain lead-out wiring 25, and the storage capacitor upper electrode 25*a* are formed by forming a film of a metal such as titanium, chromium, aluminum, molybdenum, tantalum, tungsten, and copper, a film of an alloy of such metals, a stacked film of such films by a sputtering method and the like in such a way that the film has a thickness of 1000 to 3000 Å, and patterning the film into a needed pattern by a photoetching method and the like.

The TFT 24 is formed by subjecting the above-mentioned high resistance semiconductor layer 34 and the above-mentioned low resistance semiconductor layer to channel etching by a dry etching using the patterns of the data signal line 23 and the drain lead-out wiring 25 as a mask.

Resin films such as a photosensitive acrylic resin film, inorganic insulating films such as silicon nitride film and silicon oxide film, stacked films of such films, and the like are used as the interlayer insulating film 38. For example, a stacked film including a silicon nitride film which is formed by a plasma CVD method and the like and has a thickness of 2000 Å and a photosensitive acrylic resin film which is formed on the silicon nitride film by a die coating method and has a thickness of 30000 Å, can be used.

The contact hole 26 is formed to penetrate the interlayer insulating film 38 covering the upper surface of the TFT 24, the data signal line 23, and the drain lead-out wiring 25. The contact hole 26 is formed by patterning the photosensitive acrylic resin film forming the interlayer insulating film 38 by a photolithography method (exposure and development), and, using the patterned photosensitive acrylic resin film as a mask, etching the silicon nitride film by a dry etching method.

The pixel electrode 21 is formed on the interlayer insulating film 38 by forming a conductive film having transparency of ITO (Indium Tin Oxide), IZO (Indium Zinc Oxide), zinc oxide, tin oxide, and the like, a film of an alloy of such metals, or a stacked film of such films by a sputtering method and the like in such a way that the film has a thickness of 500 to 2000 Å, and patterning the film into a needed shape by a photoetching method and the like.

Figure 9:
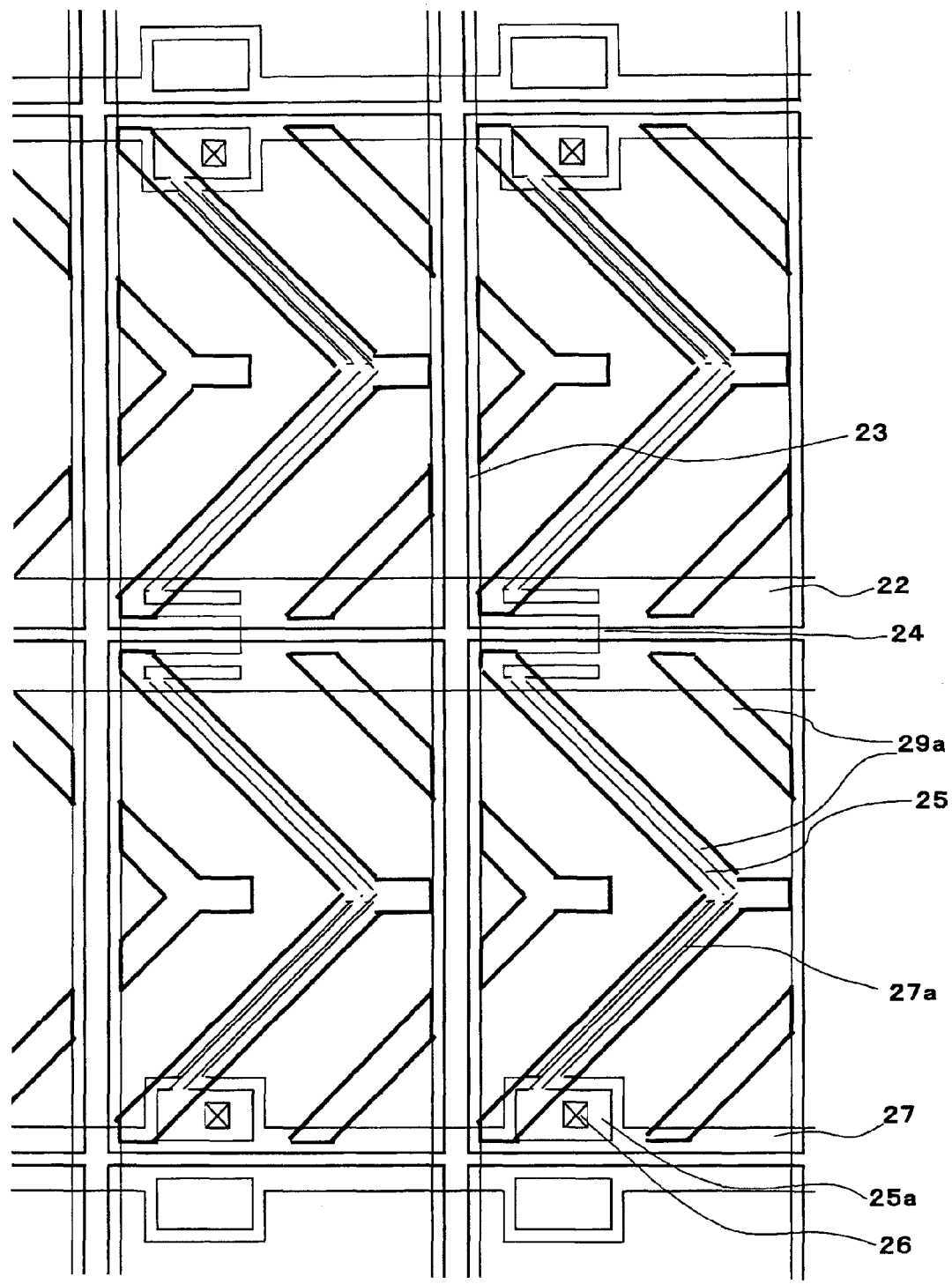
FIG. 9 is a planar view schematically showing a configuration of one pixel of an active matrix substrate according to Preferred Embodiment 8.

In order to produce the after-mentioned MVA active matrix substrate shown in FIG. 9, a process of forming a pixel electrode non-formation portion (electrode slit) inside the pixel or a process of forming a projection for liquid crystal alignment control on the pixel electrode 21 is needed when the pixel electrode 21 is pattern-formed.

According to the configuration of the present preferred Embodiment, the extending portion of the storage capacitor wiring 27*a* is formed and a storage capacity is formed between the drain lead-out wiring 25 and the extending portion of the storage capacitor wiring 27*a*, and therefore a part of the storage capacitor wiring 27 and the storage capacitor upper electrode 25*a* (a region S surrounded by the dotted line in FIG. 1) is made redundant. As a result, the wiring resistance of the storage capacitor wiring 27 is suppressed within acceptable values, and simultaneously the aperture ratio can be improved. If this configuration of the present preferred Embodiment is applied to a 32-inch WXGA active matrix substrate (pixel size= scanning signal line 22 pitch×data signal line 23 pitch=520 μm×173 μm), 0.8 or more of Ccs/Clc can be successfully secured and the aperture ratio can be successfully improved by about 0.5%. In addition, 10 μm or more of SD gap Lsd is secured and therefore reduction in yield, caused by a short circuit between the data signal line 23 and the storage capacitor upper electrode 25*a*, can be prevented.

Preferred Embodiments 2 and 3

Figure 3:
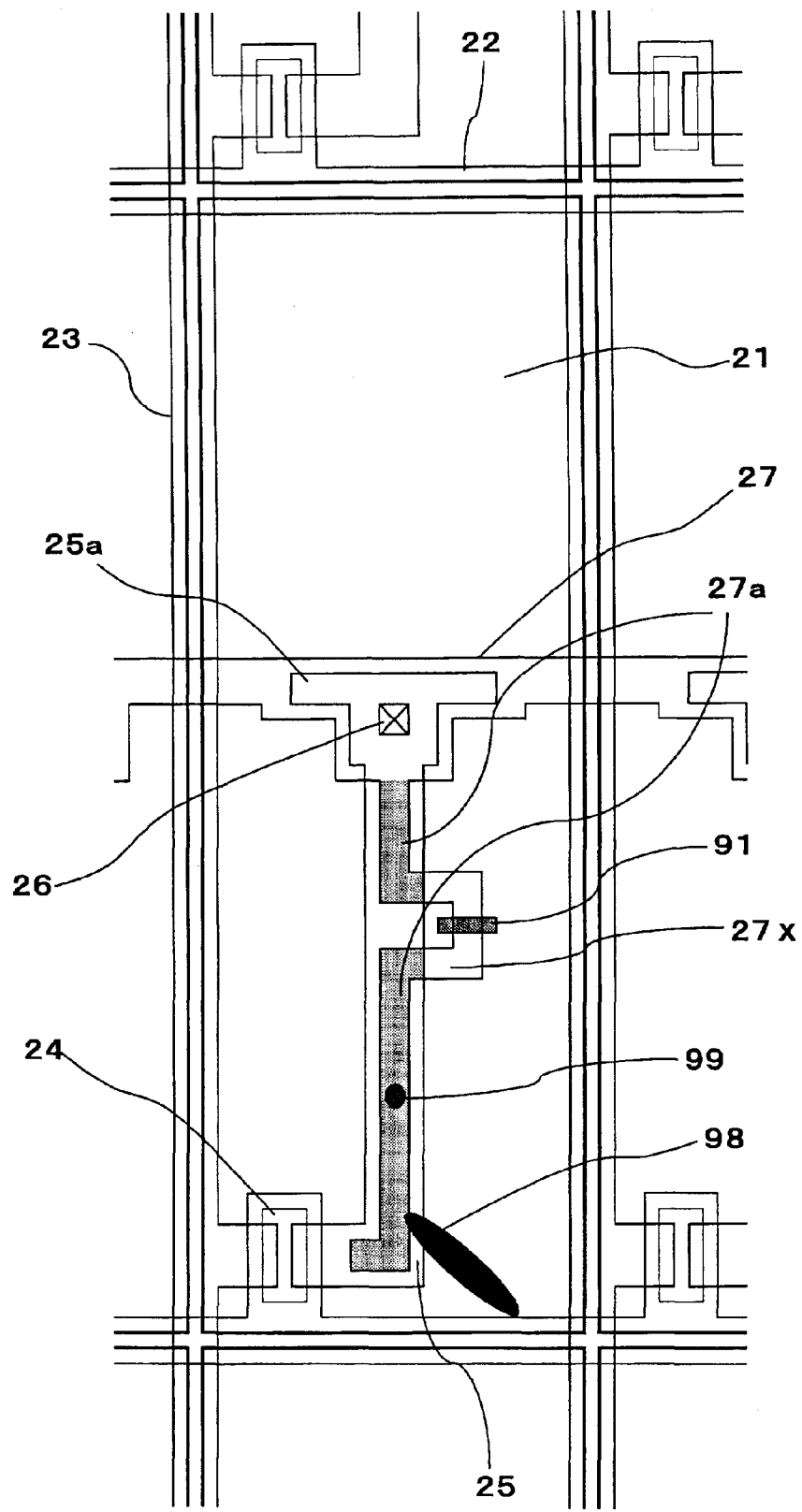
FIG. 3 is a planar view schematically showing a configuration of one pixel of an active matrix substrate according to Preferred Embodiment 2.
Figure 4:
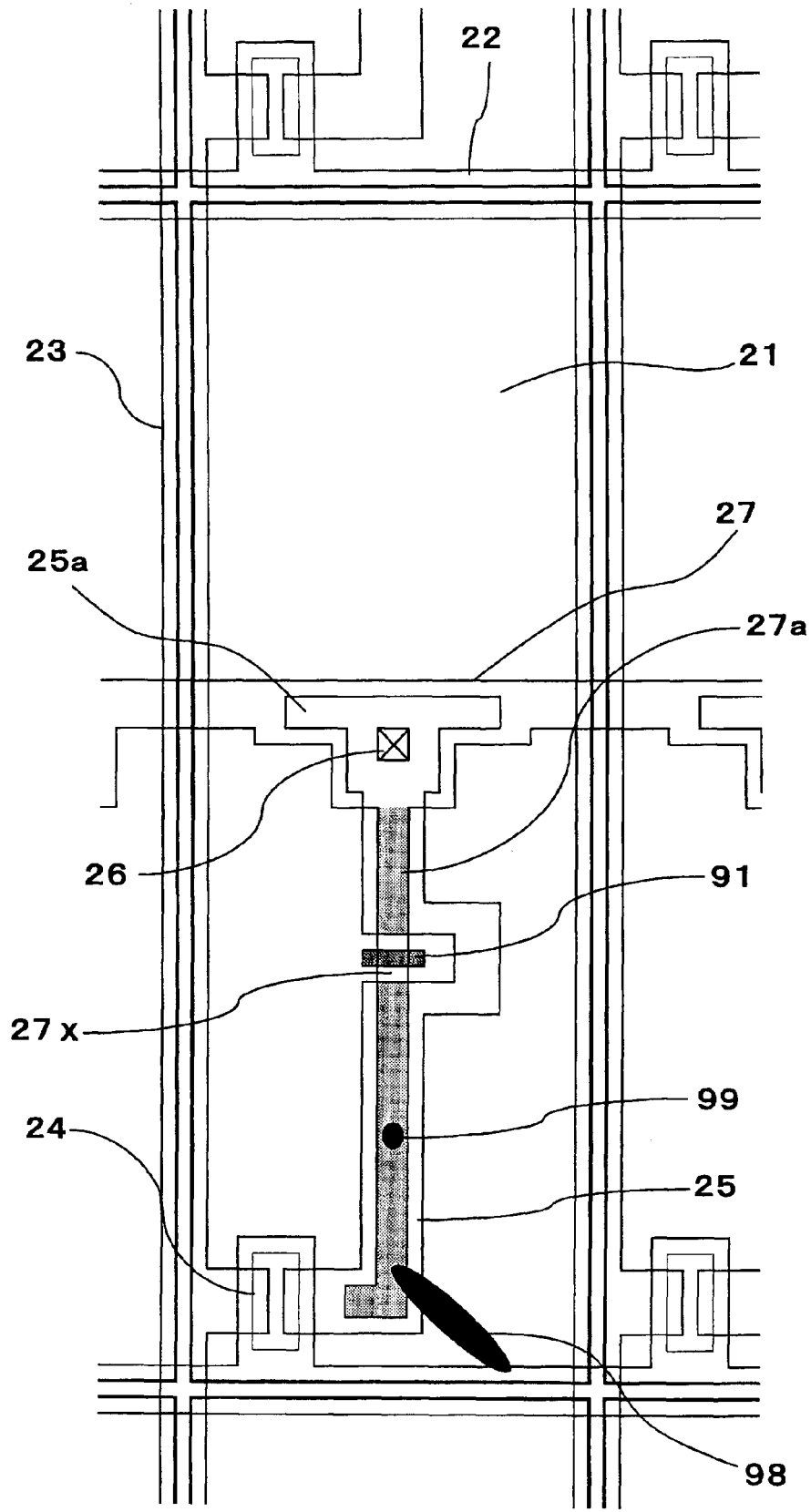
FIG. 4 is a planar view schematically showing a configuration of one pixel of an active matrix substrate according to Preferred Embodiment 3.

FIGS. 3 and 4 are planar views each schematically showing a configuration of one pixel of an active matrix substrate according to Preferred Embodiments 2 and 3, respectively.

In Preferred Embodiments 2 and 3, a separation region 27*x* not overlapping with the drain lead-out wiring 25 (hereinafter, also referred to as "non-overlapping portion") is formed in the extending portion of the storage capacitor wiring 27*a*, as shown in FIGS. 3 and 4. In Preferred Embodiment 2, a bent portion of the extending portion of the storage capacitor wiring 27*a* having a substantially linear shape is the non-overlapping portion 27*x*. In Preferred Embodiment 3, a straight-line portion of the extending portion of the storage capacitor wiring 27*a*, which corresponds to the bent portion of the substantially linear drain lead-out wiring 25, is the non-overlapping portion 27*x*. Such a pattern including the non-overlapping portion 27*x* can be easily formed just by changing the exposure pattern when the drain lead-out wiring 25 and the extending portion of the storage capacitor wiring 27*a* are formed by a photolithography method.

In Preferred Embodiments 2 and 3, the non-overlapping portion 27*x* is formed. Therefore, even if a film remainder 98 causes a short circuit between the extending portion of the storage capacitor wiring 27*a* and the scanning signal line 22 or even if a pin hole or a conductive foreign substance 99 existing in the gate insulating film between the drain lead-out wiring 25 and the extending portion of the storage capacitor wiring 27*a* causes a short circuit between the drain lead-out wiring 25 and the extending portion of the storage capacitor wiring 27*a*, a part of the short-circuited storage capacitor wiring-extending portion 27*a* is melted and separated from the storage capacitor wiring 27 by irradiating a laser irradiation portion 91 with a laser such as a YAG (Yttrium Aluminum Garnet) laser and an excimer laser. As a result, a short-circuited pixel can be repaired to serve as a normal pixel without remaining as a defective pixel.

In Preferred Embodiments 2 and 3, the configuration of the present invention in Preferred Embodiment 1 is included and therefore, the same functional effects as in Preferred Embodiment 1 can be exhibited.

Preferred Embodiment 4

Figure 5:
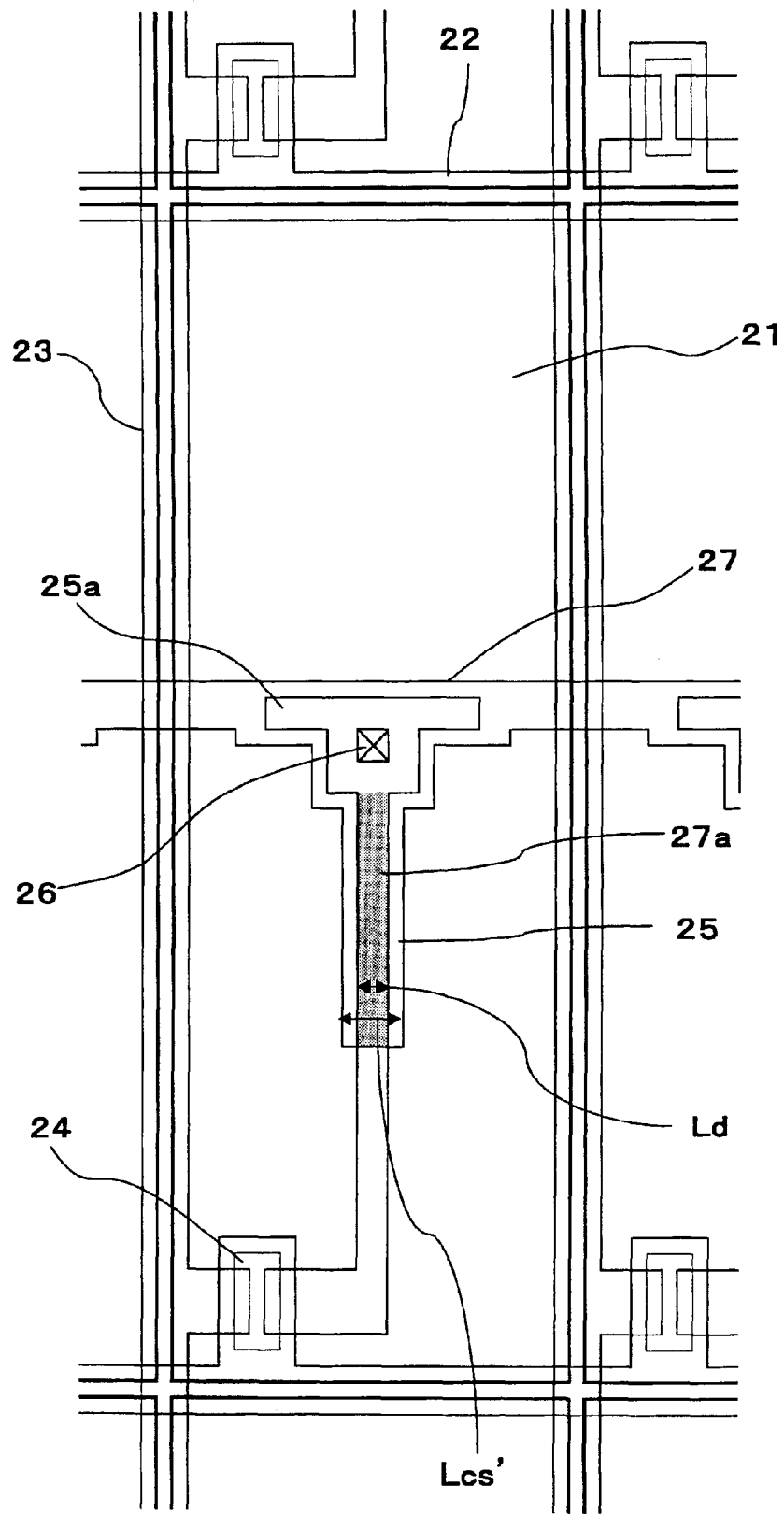
FIG. 5 is a planar view schematically showing a configuration of one pixel of an active matrix substrate according to Preferred Embodiment 4.

FIG. 5 is a planar view schematically showing a configuration of one pixel of an active matrix substrate according to Preferred Embodiment 4.

In the present Preferred Embodiment, the drain lead-out wiring 25 is formed to have a line width (Ld) smaller than a line width (Lcs') of the extending portion of the storage capacitor wiring 27*a*, as shown in FIG. 5. Generally, the extending portion of the storage capacitor wiring 27a and the drain lead-out wiring 25 are pattern-formed by a photolithography method, and the drain lead-out wiring 25 is formed after the storage capacitor wiring 27 and the scanning signal line 22 are formed. However, a short circuit is easily generated at the end of the extending portion of the storage capacitor wiring 27a pattern because the presence of the step (taper) at the end reduces the coverage of the gate insulating film 33. For this problem, in the present Preferred Embodiment, the drain lead-out wiring 25 is formed to have a line width Ld smaller than a line width Lcs' of the extending portion of the storage capacitor wiring 27a, thereby minimizing the overlapping between the end of the extending portion of the storage capacitor wiring 27a pattern and the drain lead-out wiring 25 pattern. Thus, a possibility of a short circuit between the extending portion of the storage capacitor wiring 27a and the drain lead-out wiring 25 is reduced. In addition, a possibility of displacement between the drain lead-out wiring 25 pattern and the extending portion of the storage capacitor wiring 27a pattern, caused by misalignment in the exposure step, scanning misalignment, and the like in a photolithography method, can be reduced. Therefore, a change in storage capacity, caused by a change of an area of a region where the drain lead-out wiring 25 overlaps with the extending portion of the storage capacitor wiring 27a, can be prevented.

In preferred embodiments of the present invention, it is preferable that the drain lead-out wiring 25 and the extending portion of the storage capacitor wiring 27a are formed in such a way that Lcs'–Ld>3 μm is satisfied.

In Preferred Embodiment 4, the configuration of the present invention in Preferred Embodiment 1 is included and therefore, the same functional effects as in Preferred Embodiment 1 can be exhibited.

Preferred Embodiment 5

Figure 6:
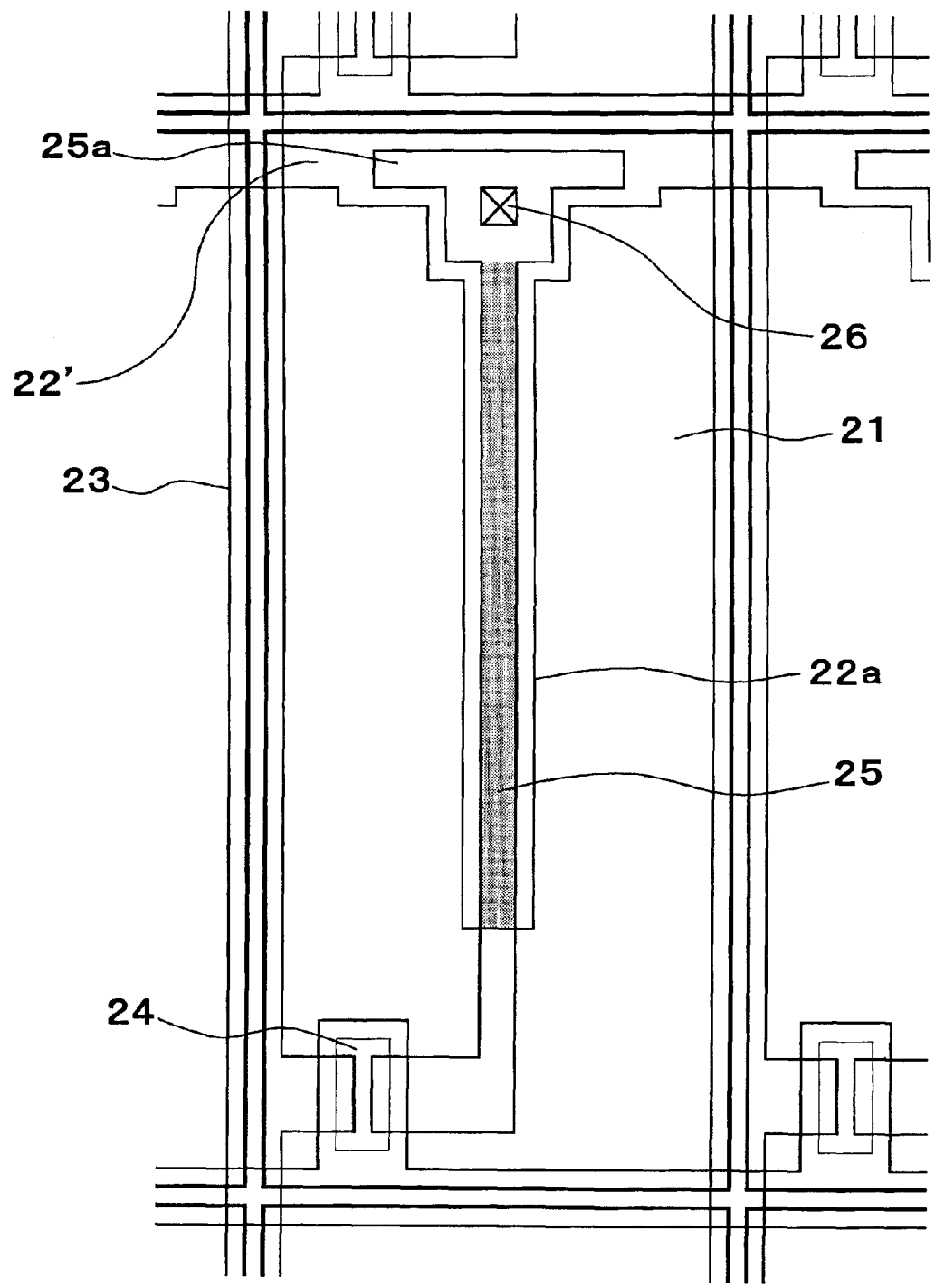
FIG. 6 is a planar view schematically showing a configuration of one pixel of an active matrix substrate according to Preferred Embodiment 5 (Cs-on-Gate system).

FIG. 6 is a planar view schematically showing a configuration of one pixel of an active matrix substrate according to Preferred Embodiment 5.

Figure 18:
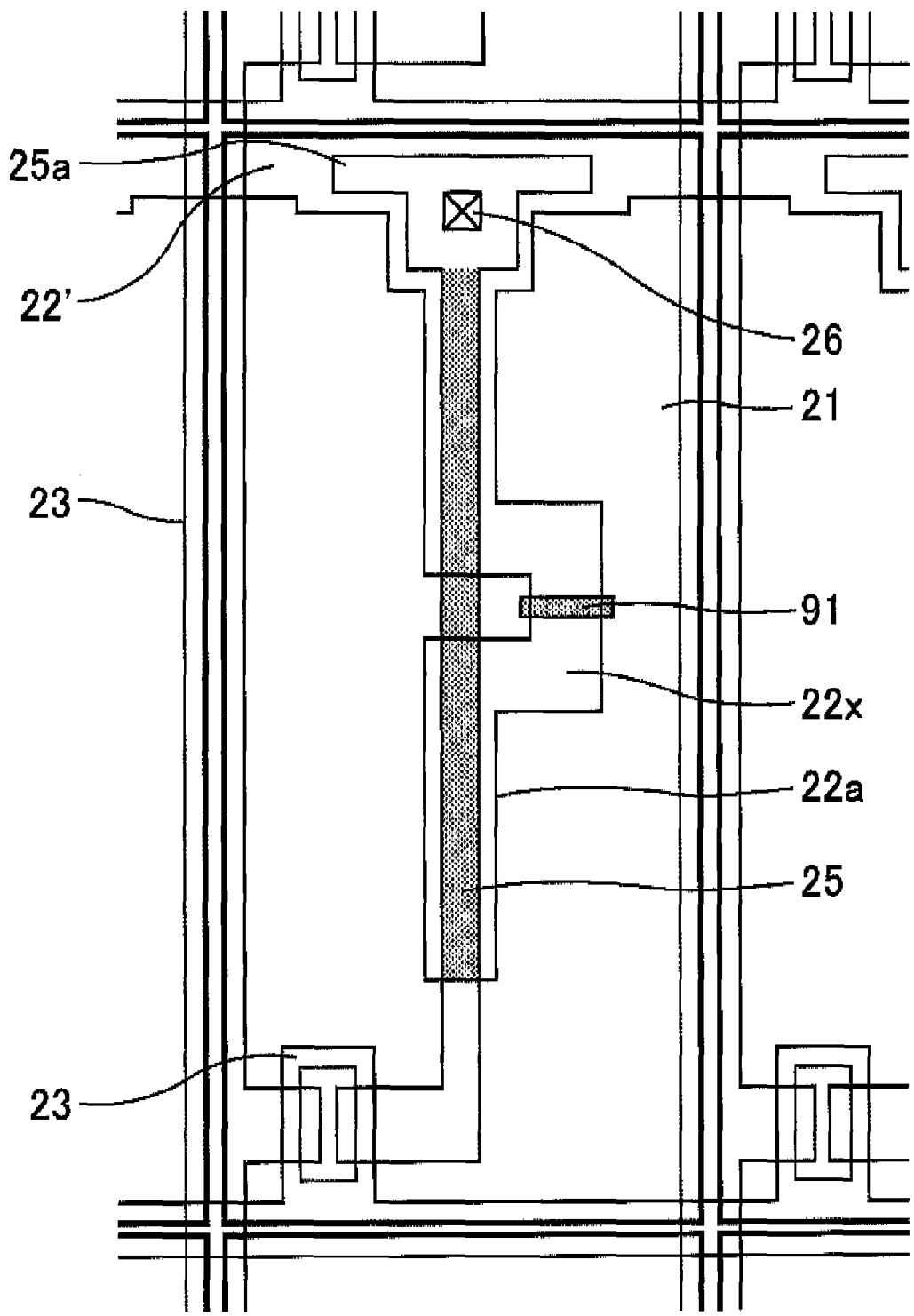
FIG. 18 is a planar view schematically showing a configuration of one pixel of an active matrix substrate according to Preferred Embodiment 5.

The present Preferred Embodiment adopts a so-called Cs-on-Gate system, in which the storage capacity is formed between the storage capacitor upper electrode 25a and a (next stage) scanning signal line 22', as shown in FIG. 6. In Preferred Embodiments 1 to 4 adopting the Cs-on-Common system, the storage capacitor wiring is formed and the storage capacity is added between the extending portion of the storage capacitor wiring and the drain lead-out wiring. In contrast, in the present Preferred Embodiment (shown in FIG. 18), an extending portion 22x of a (next stage) scanning signal line 22a is formed, thereby forming a new storage capacity between the drain lead-out wiring 25 and the extending portion 22x of the (next stage) scanning signal line 22a. According to such a configuration of Embodiment 5, the same functional effects as in Preferred Embodiment 1 can be exhibited.

Preferred Embodiment 6

Figure 7:
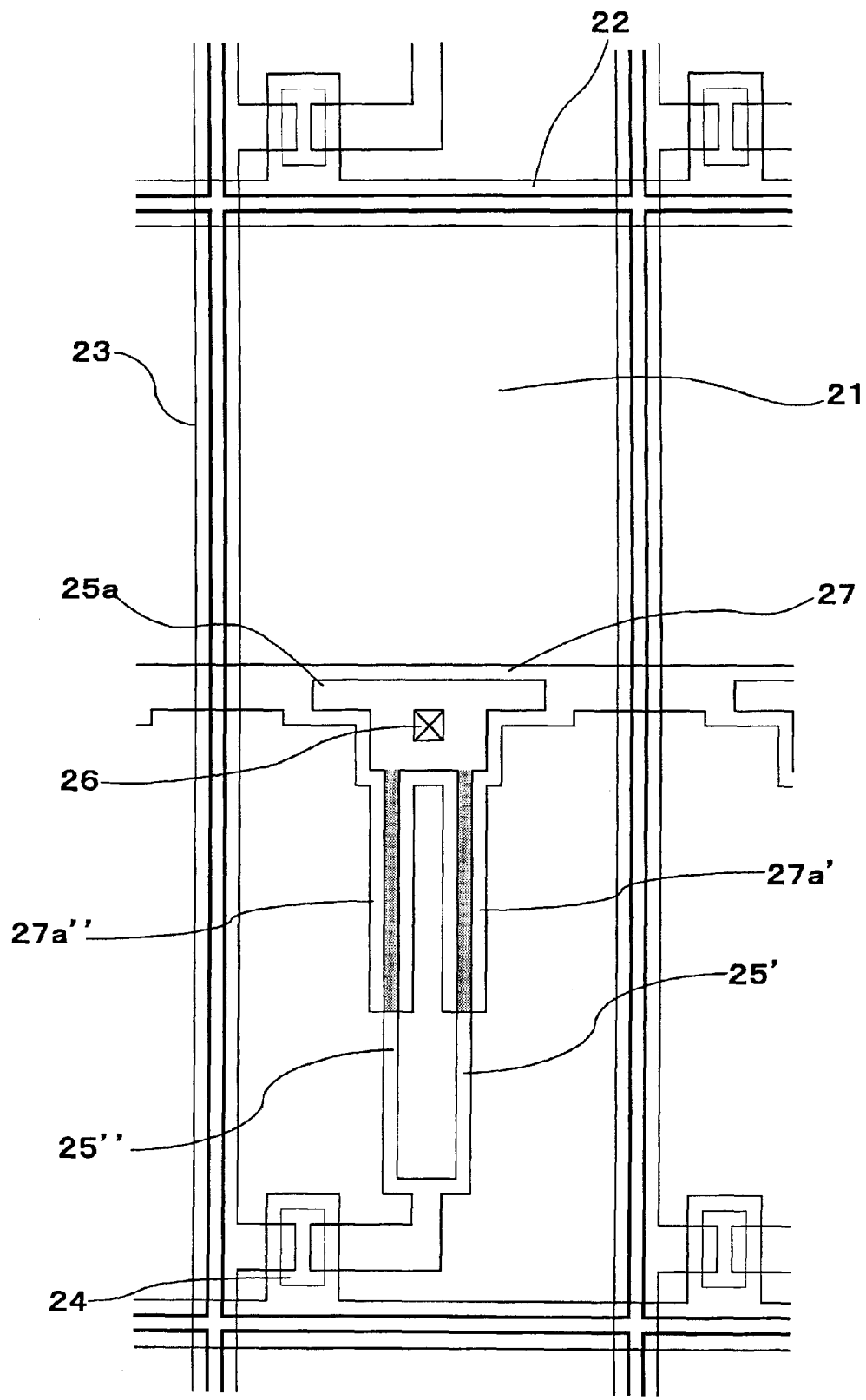
FIG. 7 is a planar view schematically showing a configuration of one pixel of an active matrix substrate according to Preferred Embodiment 6.

FIG. 7 is a planar view schematically showing a configuration of one pixel of an active matrix substrate in Preferred Embodiment 6.

In the present Preferred Embodiment, the drain lead-out wiring 25 is partly branched into plural lines, and therefore can be electrically connected to the storage capacitor upper electrode 25a through plural pathways 25' and 25", as shown in FIG. 7. According to such a redundant structure, insulation between the pixel electrode 21 and the drain electrode 36b of the TFT can be prevented even if a disconnection defect is generated in one of the pathways of the drain lead-out wiring 25. Further, the extending portion of the storage capacitor wiring 27a is branched into plural portions to overlap with the plural drain lead-out wirings 25' and 25", and thereby an area of a region where the extending portion of the storage capacitor wiring 27a overlaps with the drain lead-out wirings 25' and 25" can be increased. As a result, the storage capacity between the extending portion of the storage capacitor wiring 27a and the drain lead-out wiring 25 can be sufficiently secured.

In Preferred Embodiment 6, the configuration of the present invention in Embodiment 1 is included and therefore, the same functional effects as in Preferred Embodiment 1 can be exhibited.

Preferred Embodiment 7

Figure 8:
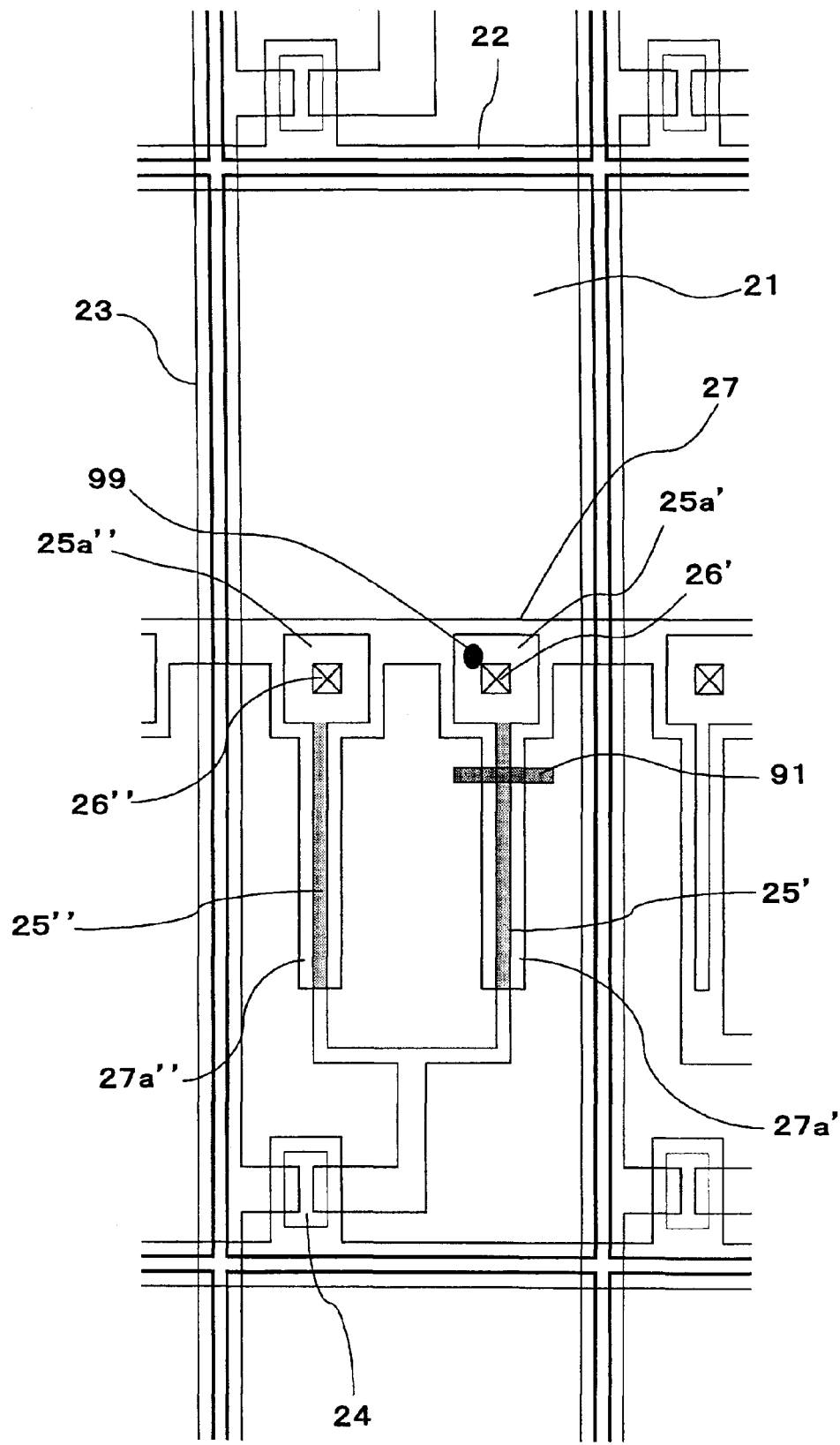
FIG. 8 is a planar view schematically showing a configuration of one pixel of an active matrix substrate according to Preferred Embodiment 7.

FIG. 8 is a planar view schematically showing a configuration of one pixel of an active matrix substrate in Preferred Embodiment 7.

In the present Preferred Embodiment, the drain lead-out wiring 25 is partly branched into plural lines and therefore can be electrically connected to the storage capacitor upper electrode 25a through plural pathways, and the storage capacitor upper electrode 25a is also divided into plural electrodes, as shown in FIG. 8. To the storage capacitor upper electrodes 25a' and 25a", the drain lead-out wirings 25' and 25" are connected, respectively. The extending portions of the storage capacitor wiring 27a' and 27a" are disposed to overlap with the drain lead-out wirings 25' and 25", respectively.

In the present Preferred Embodiment, the storage capacitor upper electrode 25a is divided into two electrodes. Therefore, even if a short circuit is generated between one storage capacitor upper electrode 25' and the storage capacitor wiring 27 and a pixel defect is generated, the pixel defect can be repaired by (1) irradiating the laser irradiation portion 91 with a YAG laser and the like, thereby electrically insulating and separating the short-circuited storage capacitor upper electrode 25a' from the TFT 24, and (2) removing the pixel electrode 21 at a region above the contact hole 26 which electrically connects the storage capacitor upper electrode 25a' to the pixel electrode 21 by a YAG laser and the like. In the drain lead-out wiring 25' after melted and separated at the laser irradiation portion 91, the drain lead-out wiring 25' on the side closer to the TFT 24 overlaps with the extending portion of the storage capacitor wiring 27a'. Therefore, even after melted and separated, the drain lead-out wiring 25a' partly forms a storage capacitor element with the extending portion of the storage capacitor wiring 27a'. Therefore, even if the pixel defect is repaired by laser irradiation, reduction in the storage capacity can be suppressed and the defective pixel can be repaired to serve as a normal pixel, which results in improvement in yield.

In Embodiment 7, the configuration of preferred embodiments of the present invention in Preferred Embodiment 1 is included and therefore, the same functional effects as in Preferred Embodiment 1 can be exhibited.

Preferred Embodiment 8

FIG. 9 is a planar view schematically showing a configuration of one pixel of a MVA active matrix substrate in Preferred Embodiment 8.

In the present Preferred Embodiment, the extending portion of the storage capacitor wiring 27a and the drain lead-out wiring 25 are formed to overlap with a pixel electrode slit (pixel electrode non-formation portion) 29a formed in the pixel electrode 21, as shown in FIG. 9. Therefore, further reduction in aperture ratio, attributed to formation of the extending portion of the storage capacitor wiring 27a and the drain lead-out wiring 25, can be prevented because the contribution to the aperture ratio at the region where the pixel electrode slit 29a is formed is small.

In Preferred Embodiment 8, the configuration of the present invention in Preferred Embodiment 1 is included and therefore, the same functional effects as in Preferred Embodiment 1 can be exhibited.

Preferred Embodiments 9 to 11

Figure 10:
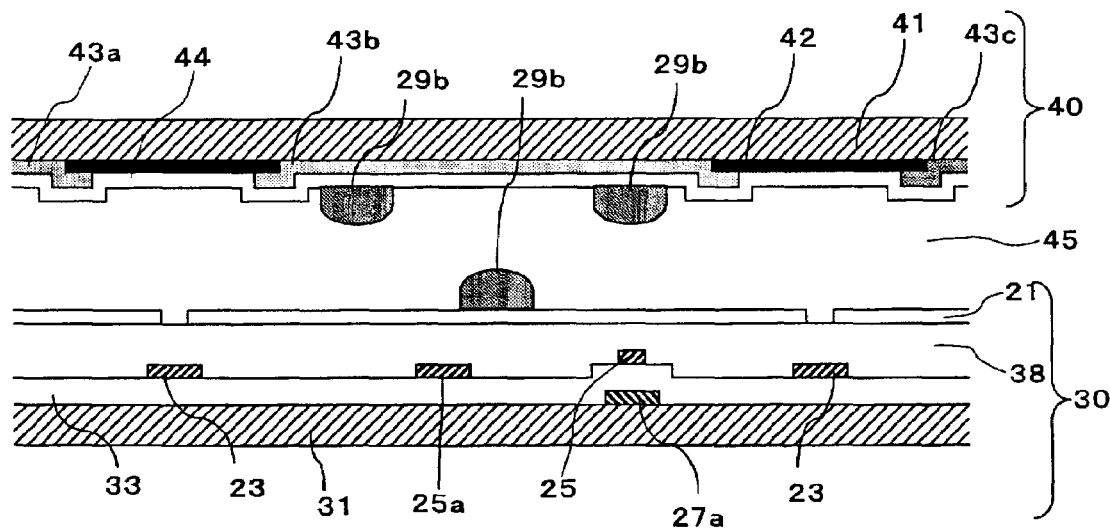
FIG. 10 is a cross-sectional view schematically showing a liquid crystal display device according to Preferred Embodiment 9.
Figure 11:
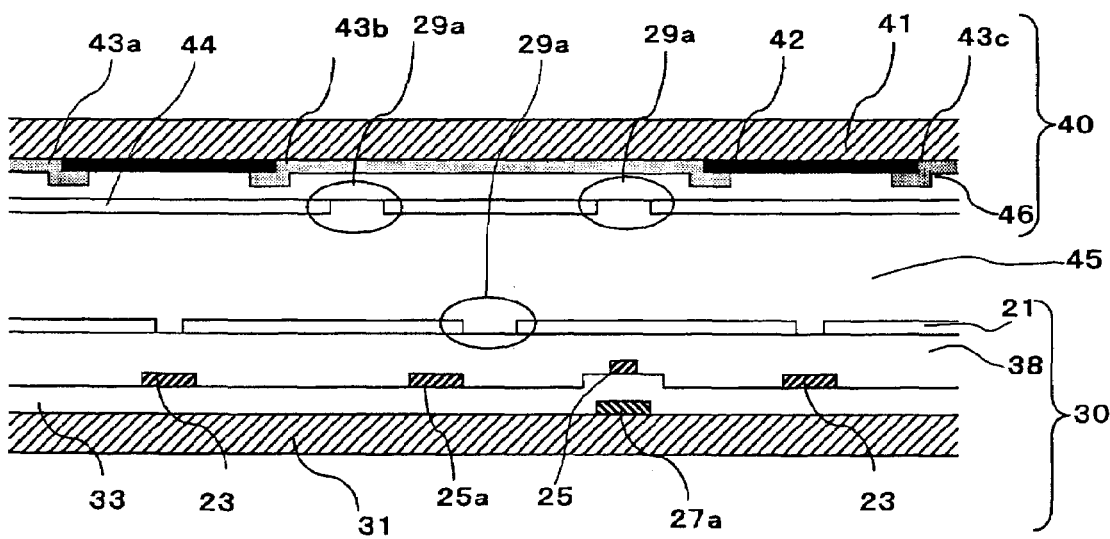
FIG. 11 is a cross-sectional view schematically showing a liquid crystal display device according to Preferred Embodiment 10.
Figure 12:
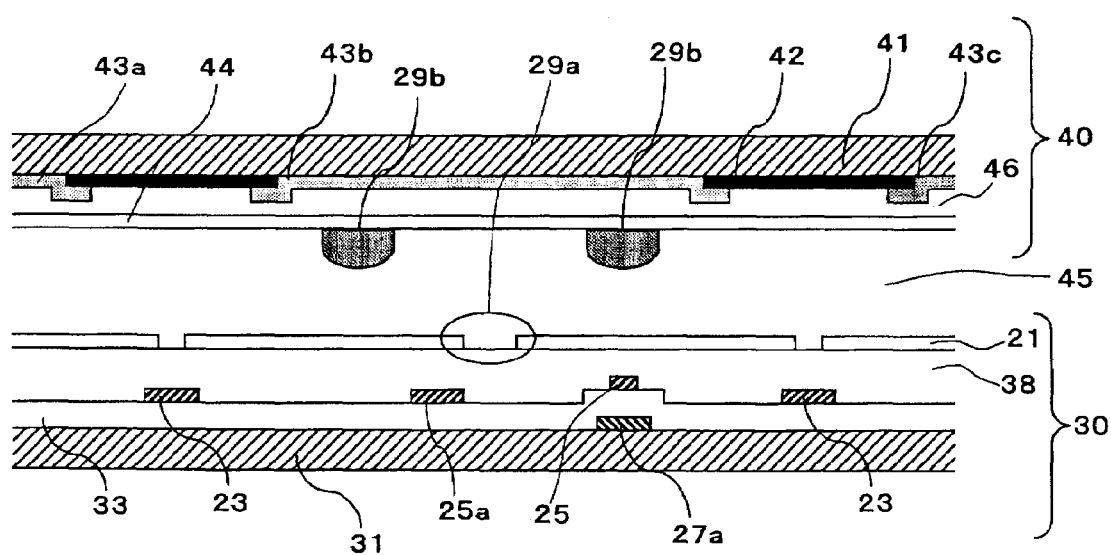
FIG. 12 is a cross-sectional view schematically showing a liquid crystal display device according to Preferred Embodiment 11.

FIGS. 10, 11, and 12 are cross-sectional views schematically showing liquid crystal display devices in Preferred Embodiments 9, 10, and 11, respectively.

In Preferred Embodiment 9, a projection for liquid crystal alignment control 29b is formed in both an active matrix substrate 30 and a counter substrate 40, as shown in FIG. 10. In Preferred Embodiment 10, an electrode non-formation portion 29a is formed in both the active matrix substrate 30 and the counter substrate 40, as shown in FIG. 11. In Preferred Embodiment 11, the electrode non-formation portion 29b is formed in the active matrix substrate 30, and the projection for liquid alignment control 29b is formed in the counter substrate 40, as shown in FIG. 12.

In these Preferred Embodiments, the extending portion of the storage capacitor wiring 27a and the drain lead-out wiring 25 in the active matrix substrate 30 are formed to overlap with the projection for liquid crystal alignment control 29b or the electrode non-formation portion 29a formed in the active matrix substrate 30 and/or the counter substrate 40. The projection for liquid crystal alignment control 29b or the electrode non-formation portion 29a is a structure commonly formed in a MVA liquid crystal display device, and its contribution to the aperture ratio is small. Therefore, the extending portion of the storage capacitor wiring 27a and the drain lead-out wiring 25 are formed to overlap with the projection for liquid crystal alignment control 29b or the electrode non-formation portion 29a, and thereby further reduction in aperture ratio, caused by the formation of such structures, can be prevented.

In Preferred Embodiments 9 to 11, the configuration of the present invention in Preferred Embodiment 1 is included and therefore, the same functional effects as in Preferred Embodiment 1 can be exhibited.

Preferred Embodiment 12

Figure 13:
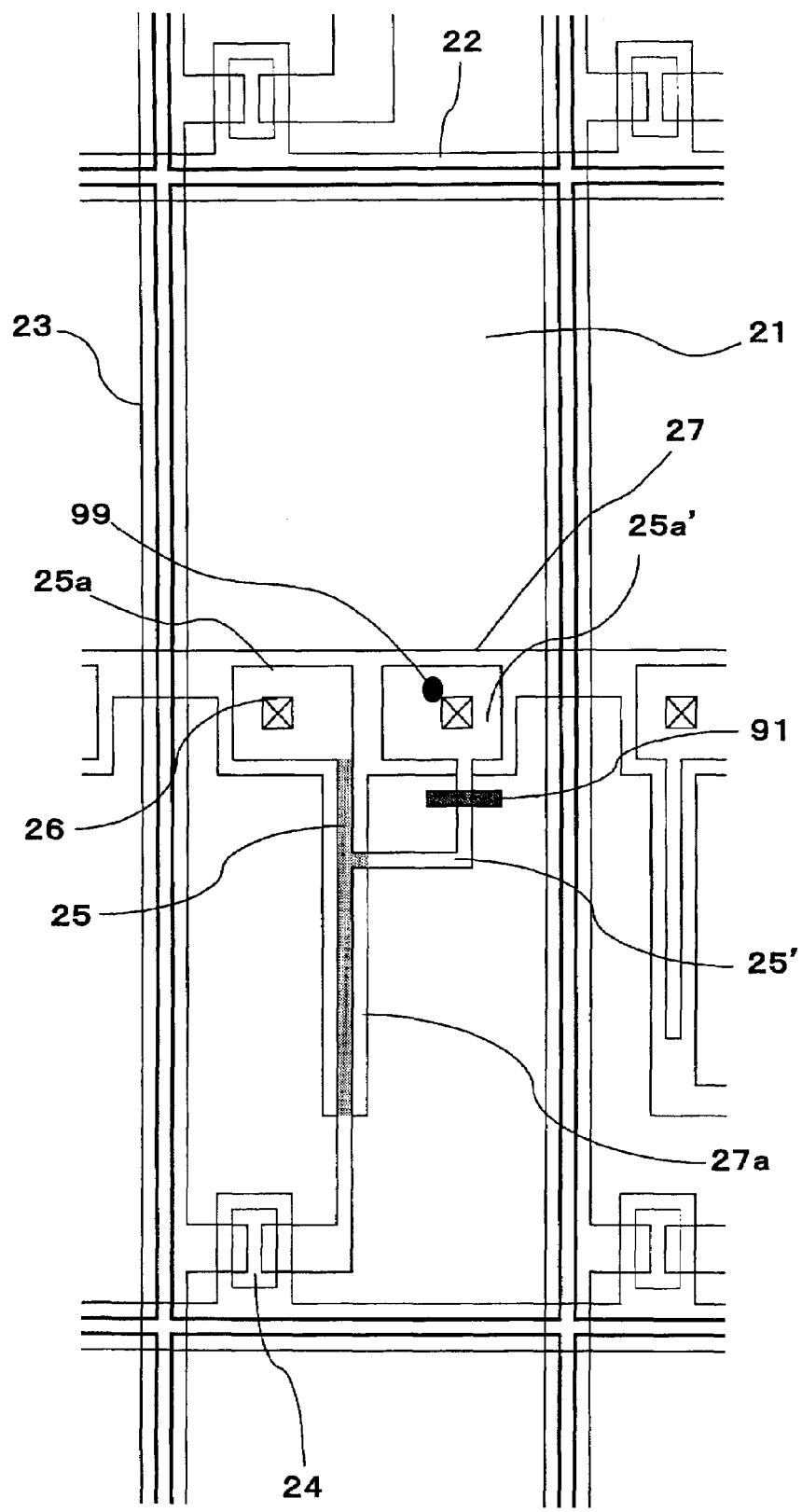
FIG. 13 is a planar view schematically showing a configuration of one pixel of an active matrix substrate according to Preferred Embodiment 12.

FIG. 13 is a planar view schematically showing a configuration of one pixel of an active matrix substrate in Preferred Embodiment 12.

In the present Preferred Embodiment, the drain lead-out wirings 25 and 25' are partly branched into plural lines, and therefore can be electrically connected to the storage capacitor upper electrode 25a through plural pathways 25 and 25', and also the storage capacitor upper electrode 25a is divided into plural electrodes, as shown in FIG. 13. To the storage capacitor upper electrodes 25a and 25a', the drain lead-out wirings 25 and 25' are connected, respectively. The extending portion of the storage capacitor wiring 27a is disposed to overlap with the drain lead-out wiring 25. In the present Preferred Embodiment, the storage capacitor upper electrode 25a is divided into two electrodes. Therefore, even if a short circuit is generated between one storage capacitor upper electrode 25a' and the storage capacitor wiring 27 and a pixel defect is generated, the pixel defect can be repaired by (1) irradiating the laser irradiation portion 91 with a YAG laser and the like, thereby electrically insulating and separating the short-circuited storage capacitor upper electrode 25a' from the TFT 24, and (2) removing the pixel electrode 21 at a region above that contact hole 26 which electrically connects the storage capacitor upper electrode 25a' to the pixel electrode 21 by a YAG laser and the like.

In Preferred Embodiment 12, the configuration of the present invention in Preferred Embodiment 1 is included and therefore, the same functional effects as in Preferred Embodiment 1 can be exhibited.

Preferred Embodiment 13

Figure 14:
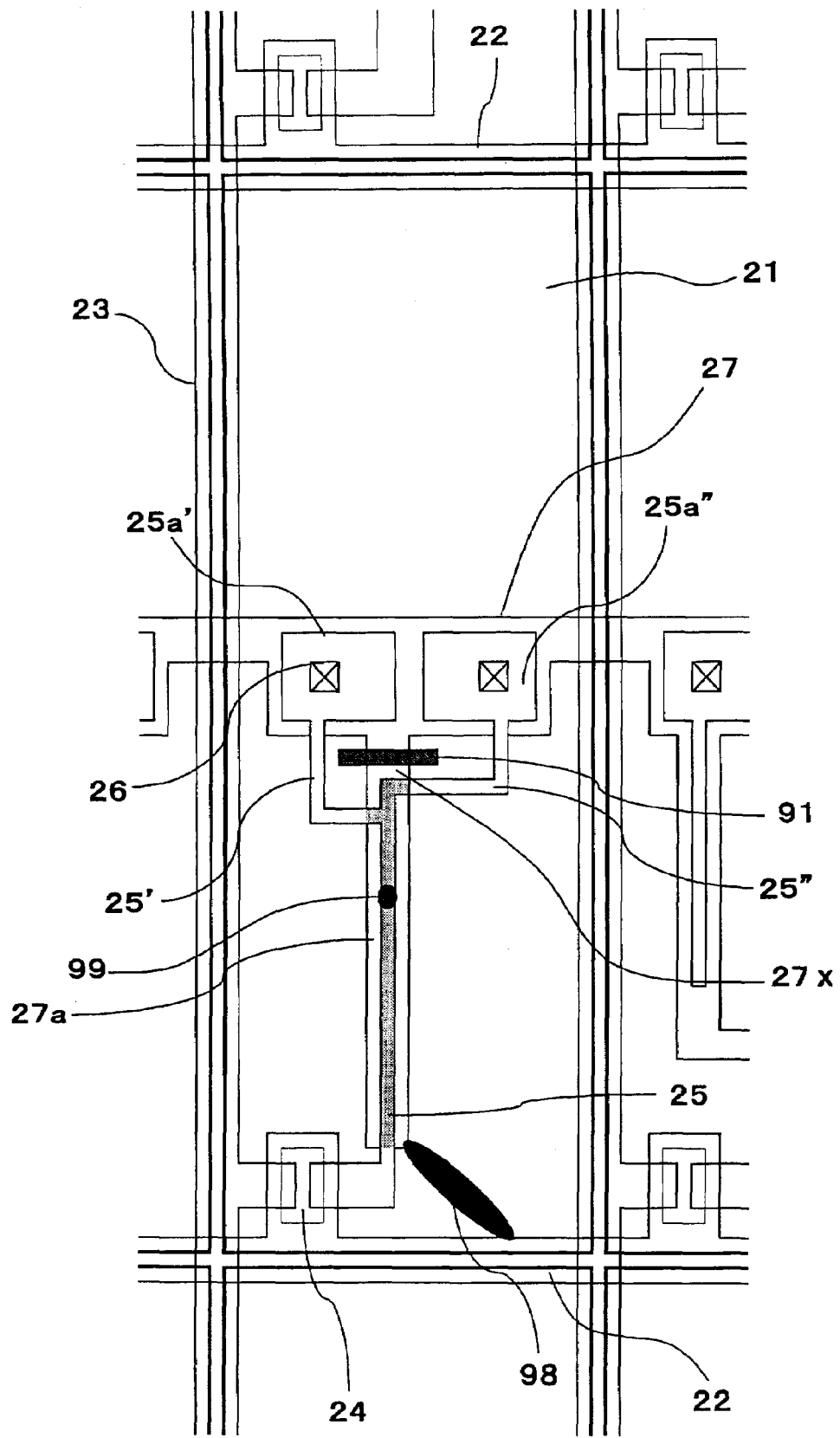
FIG. 14 is a planar view schematically showing a configuration of one pixel of an active matrix substrate according to Preferred Embodiment 13.
Figure 15:
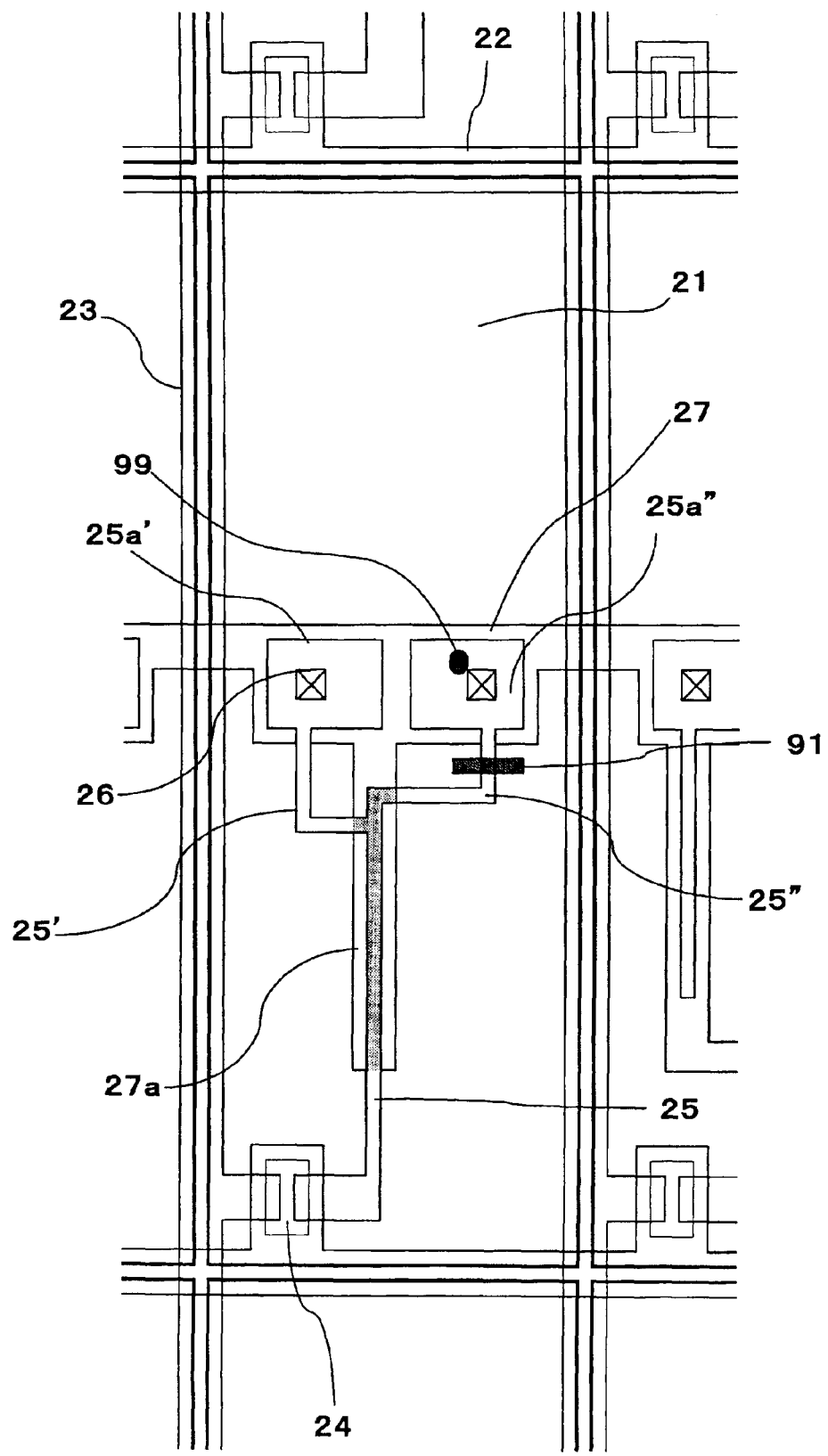
FIG. 15 is a planar view schematically showing a configuration of one pixel of the active matrix substrate according to Preferred Embodiment 13 (when a short-cut is generated at a portion different from that in FIG. 14).
Figure 16:
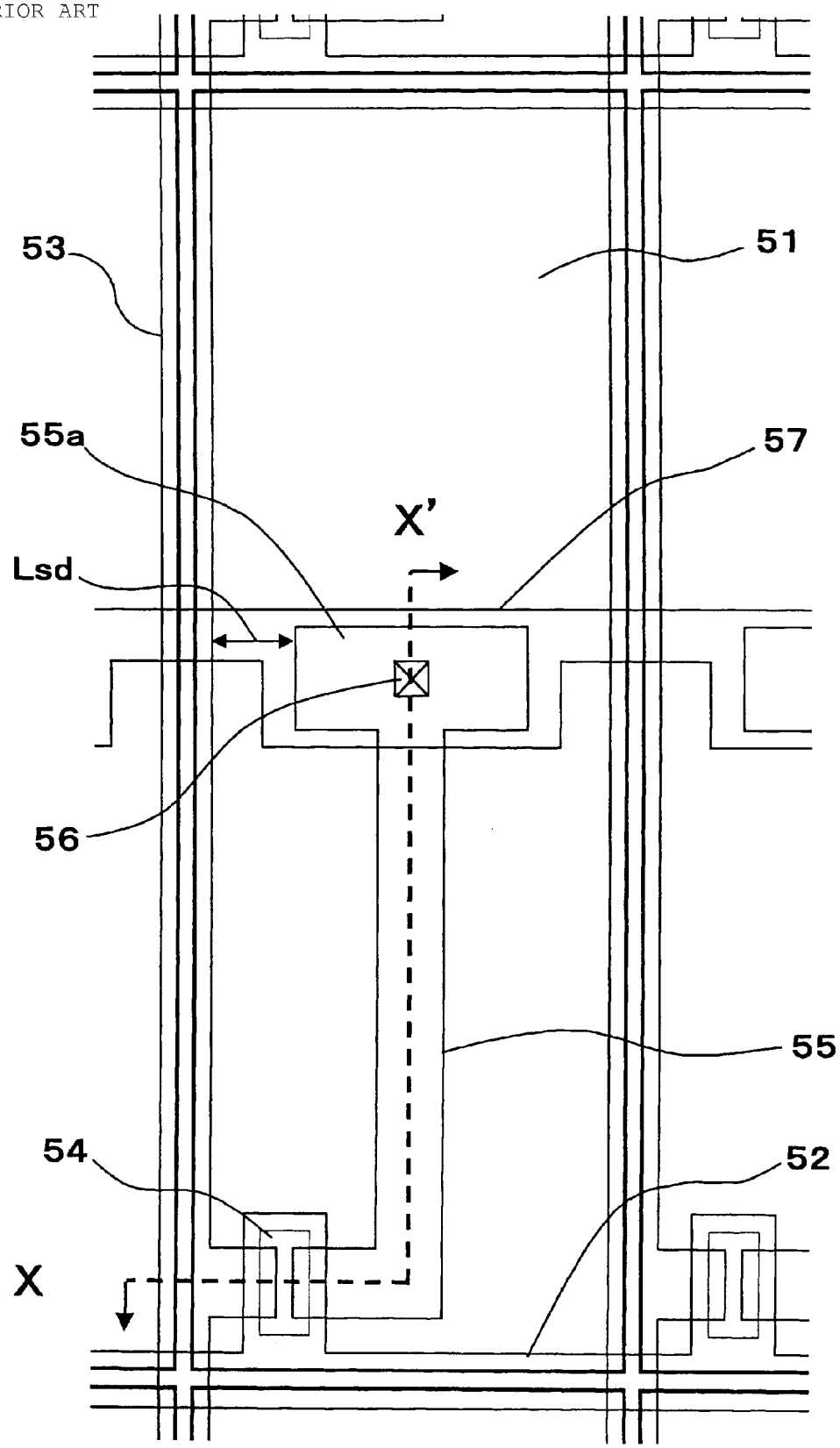
FIG. 16 is a planar view schematically showing a configuration of one pixel of a conventional active matrix substrate.
Figure 17:
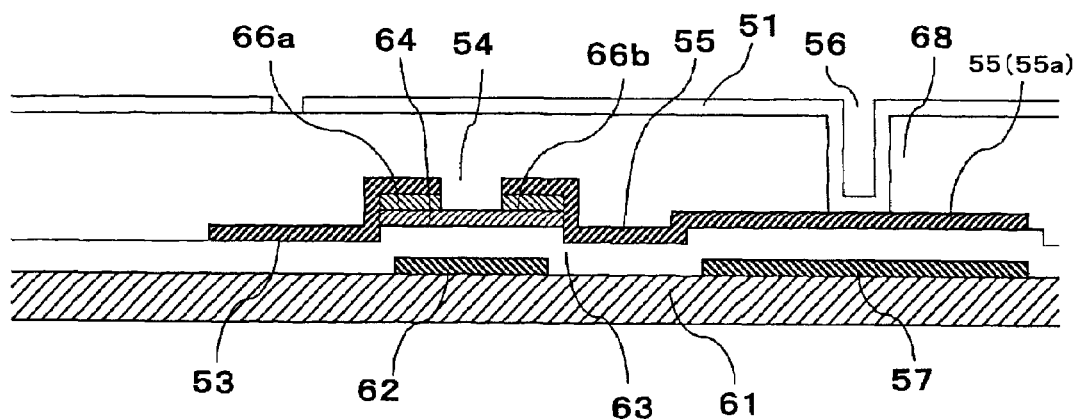
FIG. 17 is a cross-sectional view schematically showing a cross-section of the active matrix substrate taken along line X-X' in FIG. 16.

FIGS. 14 and 15 are planar views each schematically showing a configuration of one pixel of an active matrix substrate in Preferred Embodiment 13.

In Preferred Embodiment 13, a non-overlapping portion 27x is formed in the extending portion of the storage capacitor wiring 27a, as shown in FIG. 14. In Preferred Embodiment 13, the straight-line portion of the extending portion of the storage capacitor wiring 27a, which corresponds to the bent portions 25' and 25" of the drain lead-out wirings 25, 25', and 25", is the non-overlapping portion 27x, and the non-overlapping portion 27x is disposed at a boundary between the storage capacitor wiring 27 and the extending portion of the storage capacitor wiring 27a, as shown in FIG. 14. In Preferred Embodiment 13, the non-overlapping portion 27x is formed. Therefore, as shown in FIG. 14, if the film remainder 98 causes a short circuit between the extending portion of the storage capacitor wiring 27a and the scanning signal line 22 or if a pin hole or the conductive foreign substance 99 existing in the gate insulating film between the drain lead-out wiring 25 and the extending portion of the storage capacitor wiring 27a causes a short circuit between the drain lead-out wiring 25 and the extending portion of the storage capacitor wiring 27a, a part of the short-circuited extending portion of the storage capacitor wiring 27a is melted and separated from the storage capacitor wiring 27 by irradiating the laser irradiation portion 91 with a laser such as a YAG laser and an excimer laser. As a result, a short-circuited pixel can be repaired to serve as a normal pixel without remaining as a defective pixel. The non-overlapping portion 27x is disposed not in the middle of the extending portion of the storage capacitor wiring 27a but at the boundary with the storage capacitor wiring 27, and thereby the storage capacitor wiring-extending portion 27a can be electrically insulated and separated from the drain lead-out wiring 25 wherever the short circuit is generated. As a result, the short-circuited pixel can be repaired to serve as a normal pixel without remaining as defective pixel.

In the present Preferred Embodiment, the drain lead-out wirings 25, 25', and 25" are partly branched into plural lines, and therefore can be electrically connected to the storage capacitor upper electrode 25a through plural pathways 25' and 25", and the storage capacitor upper electrode 25a is also divided into two electrodes, as shown in FIG. 15. To the storage capacitor upper electrodes 25a' and 25a", the drain lead-out wirings 25' and 25" are connected, respectively. The extending portion of the storage capacitor wiring 27a is disposed to overlap with the drain lead-out wiring 25.

In the present Preferred Embodiment, the storage capacitor upper electrode 25a is divided into two electrodes. Therefore, even if a short circuit is generated between one storage capacitor upper electrode 25a" and the storage capacitor wiring 27 and a pixel defect is generated, the pixel defect can be repaired by (1) irradiating the laser irradiation portion 91 with a YAG laser and the like, thereby electrically insulating and separating the short-circuited storage capacitor upper electrode 25a" from the TFT 24, and (2) removing the pixel electrode 21 at a region above the contact hole 26 which electrically connects the storage capacitor upper electrode 25a" to the pixel electrode 21 by a YAG laser and the like.

In Preferred Embodiment 13, the configuration of the present invention in Preferred Embodiment 1 is included and therefore, the same functional effects as in Preferred Embodiment 1 can be exhibited.

This Non-provisional application claims priority (under 35 U.S.C. §119) on Patent Application No. 2004-332889 filed in Japan on Nov. 17, 2004 and Patent Application No. 2005-178217 filed in Japan on Jun. 17, 2005, the entire contents of which are hereby incorporated by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An active matrix substrate comprising:
a scanning signal line;
a data signal line;
a drain lead-out wiring;
a thin film transistor including a gate electrode connected to the scanning signal line, a source electrode connected to the data signal line, and a drain electrode connected to the drain lead-out wiring;
a pixel electrode;
a storage capacitor upper electrode connected to the drain lead-out wiring and the pixel electrode;
an insulating film; and
a storage capacitor wiring overlapping with the storage capacitor upper electrode through the insulating film; wherein the storage capacitor wiring includes an extending portion that includes a first region overlapping with the drain lead-out wiring with the insulating film therebetween and a second region that does not overlap with the drain lead-out wiring; and
the extending portion is arranged such that the extending portion can be cut at the second region to separate the second region into a first portion connected to the storage capacitor wiring and a second portion not connected to the storage capacitor wiring to isolate a short-circuited portion from the storage capacitor wiring.

2. The active matrix substrate according to claim 1, wherein the extending portion of the storage capacitor wiring has a substantially linear shape, and the drain lead-out wiring has a line width smaller than a line width of the extending portion of the storage capacitor wiring.

3. The active matrix substrate according to claim 1, wherein the drain lead-out wiring has two or more different pathways.

4. The active matrix substrate according to claim 1, wherein the storage capacitor upper electrode is divided into two or more portions in one pixel, and each portion is connected to the drain lead-out wiring, and the drain lead-out wiring has a separation region not overlapping with the extending portion of the storage capacitor wiring at least one connecting portion with the storage capacitor upper electrode.

5. The active matrix substrate according to claim 1, wherein the storage capacitor upper electrode is divided into two or more portions in one pixel, and each portion is connected to the drain lead-out wiring, and the extending portion of the storage capacitor wiring has a separation region not overlapping with the drain lead-out wiring at a boundary with the storage capacitor wiring.

6. A display device comprising the active matrix substrate of claim 1.

7. A liquid crystal display device comprising the active matrix substrate of claim 1.

8. An active matrix substrate comprising:
a scanning signal line;
a data signal line;
a drain lead-out wiring;
a thin film transistor including a gate electrode connected to the scanning signal line, a source electrode connected to the data signal line, and a drain electrode connected to the drain lead-out wiring;
a pixel electrode;
a storage capacitor upper electrode connected to the drain lead-out wiring and the pixel electrode; and
an insulating film; wherein
the scanning signal line includes a portion overlapping with the storage capacitor upper electrode with the insulating film therebetween and includes an extending portion that includes a first region overlapping with the drain lead-out wiring with the insulating film therebetween and a second region that does not overlap with the drain lead-out wiring; and
the extending portion is arranged such that the extending portion can be cut at the second region to separate the second region into a first portion connected to the scanning signal line and a second portion not connected to the scanning signal line to isolate a short-circuited portion from the scanning signal line.

9. The active matrix substrate according to claim 8, wherein the extending portion of the scanning signal line has a substantially linear shape, and the drain lead-out wiring has a line width smaller than a line width of the extending portion of the scanning signal line.

10. The active matrix substrate according to claim 8, wherein the drain lead-out wiring has two or more different pathways.

11. The active matrix substrate according to claim 8, wherein the storage capacitor upper electrode is divided into two or more portions in one pixel, and each portion is connected to the drain lead-out wiring, and the drain lead-out wiring has a separation region not overlapping with the extending portion of the scanning signal line at least one connecting portion with the storage capacitor upper electrode.

12. The active matrix substrate according to claim 8, wherein the storage capacitor upper electrode is divided into two or more portions in one pixel, and each portion is connected to the drain lead-out wiring, and the extending portion of the scanning signal line has a separation region not overlapping with the drain lead-out wiring located at a boundary with the scanning signal line.

13. A display device comprising the active matrix substrate of claim 8.

14. A liquid crystal display device comprising the active matrix substrate of claim 8.

15. An active matrix substrate comprising:
a thin film transistor disposed at an intersection of a scanning signal line with a data signal line on a substrate, the thin film transistor including a gate electrode connected to the scanning signal line, a source electrode connected to the data signal line, and a drain electrode connected to a drain lead-out wiring;

a storage capacitor upper electrode connected to the drain lead-out wiring and a pixel electrode; and a storage capacitor wiring overlapping with the storage capacitor upper electrode with an insulating film therebetween; wherein the storage capacitor wiring includes an extending portion overlapping with the drain lead-out wiring through the insulating film; and the extending portion of the storage capacitor wiring includes a portion overlapping with at least one of a projection for liquid crystal alignment control and an electrode non-formation portion in a liquid crystal display device.

16. An active matrix substrate comprising:

a thin film transistor disposed at an intersection of a scanning signal line with a data signal line on a substrate, the thin film transistor including a gate electrode connected to the scanning signal line, a source electrode connected to the data signal line, and a drain electrode connected to a drain lead-out wiring; and a storage capacitor upper electrode connected to the drain lead-out wiring and a pixel electrode; wherein the scanning signal line includes a portion overlapping with the storage capacitor upper electrode with an insulating film therebetween and has an extending portion overlapping, with the insulating film therebetween, with the drain lead-out wiring connected to the storage capacitor upper electrode; and the extending portion of the scanning signal line includes a portion overlapping with at least one of a projection for liquid crystal alignment control and an electrode non-formation portion in a liquid crystal display device.

17. A liquid crystal display device comprising:

an active matrix substrate including:

a thin film transistor disposed at an intersection of a scanning signal line with a data signal line on a substrate, the thin film transistor including a gate electrode connected to the scanning signal line, a source electrode connected to the data signal line, and a drain electrode connected to a drain lead-out wiring;

a storage capacitor upper electrode connected to the drain lead-out wiring and a pixel electrode; and a storage capacitor wiring overlapping with the storage capacitor upper electrode with an insulating film therebetween; and a counter electrode-formed counter substrate at a position opposite to the active matrix substrate wherein the storage capacitor wiring includes an extending portion overlapping with the drain lead-out wiring with the insulating film therebetween; and the extending portion of the storage capacitor wiring formed in the active matrix substrate includes a portion overlapping with at least one of a projection for liquid crystal alignment control, a pixel electrode non-formation portion, and a counter electrode non-formation portion, disposed in at least one of the active matrix substrate and the counter substrate.

18. A liquid crystal display device comprising:

an active matrix substrate including:

a thin film transistor disposed at an intersection of a scanning signal line with a data signal line on a substrate, the thin film transistor including a gate electrode connected to the scanning signal line, a source electrode connected to the data signal line, and a drain electrode connected to a drain lead-out wiring; and a storage capacitor upper electrode connected to the drain lead-out wiring and a pixel electrode; and a counter electrode-formed counter substrate at a position opposite to the active matrix substrate; wherein the scanning signal line includes a portion overlapping with the storage capacitor upper electrode with an insulating film therebetween and has an extending portion overlapping, with the insulating film therebetween, with the drain lead-out wiring connected to the storage capacitor upper electrode; and the extending portion of the scanning signal line formed in the active matrix substrate includes a portion overlapping with at least one of a projection for liquid crystal alignment control, a pixel electrode non-formation portion, and a counter electrode non-formation portion, each disposed in at least one of the active matrix substrate and the counter substrate.

* * * * *